US012632873B2

(12) United States Patent (10) Patent No.: US 12,632,873 B2

Brogger et al. (45) Date of Patent: May 19, 2026

(54) STRATEGIES AND SYSTEMS THAT USE SPECTRAL SIGNATURES AND A REMOTE AUTHENTICATION AUTHORITY TO AUTHENTICATE PHYSICAL ITEMS AND LINKED DOCUMENTS

(71) Applicant: Microtrace, LLC, Minneapolis, MN (US)

(72) Inventors: Brian J. Brogger, Blaine, MN (US); Joseph T. Ippoliti, Woodbury, MN (US); Blake M. Roeglin, Minneapolis, MN (US); Brian T. Bustrom, Mounds View, MN (US)

(73) Assignee: Microtrace, LLC, Minneapolis, MN (US)

( * ) Notice: Subject to any disclaimer, the term of this patent is extended or adjusted under 35 U.S.C. 154(b) by 223 days.

(21) Appl. No.: 18/021,516

(22) PCT Filed: Aug. 18, 2021

(86) PCT No.: PCT/US2021/046491

§ 371 (c)(1),
(2) Date: Feb. 15, 2023

(87) PCT Pub. No.: WO2022/040304

PCT Pub. Date: Feb. 24, 2022

(65) Prior Publication Data

US 2023/0298044 A1 Sep. 21, 2023

Related U.S. Application Data

(60) Provisional application No. 63/067,639, filed on Aug. 19, 2020.

(51) Int. Cl.
| | |
|---|---|
| *G06Q 30/018* | (2023.01) |
| *G07D 7/0043* | (2016.01) |
| *G07D 7/1205* | (2016.01) |

(52) U.S. Cl.
CPC ....... *G06Q 30/018* (2013.01); *G06Q 30/0185* (2013.01); *G07D 7/0043* (2017.05); *G07D 7/1205* (2017.05)

(58) Field of Classification Search
CPC .. G06Q 30/018; G06Q 30/0185; G06Q 50/18; G07D 7/0043; G07D 7/1205
See application file for complete search history.

(56) References Cited

U.S. PATENT DOCUMENTS

| | | | |
|---|---|---|---|
| 3,904,642 | A | 9/1975 | Mach et al. |
| 4,005,111 | A | 1/1977 | Mach et al. |

(Continued)

FOREIGN PATENT DOCUMENTS

| | | |
|---|---|---|
| CN | 101688072 A | 3/2010 |
| CN | 103102735 A | 5/2013 |

(Continued)

OTHER PUBLICATIONS

U.S. Appl. No. 17/760,979, filed Mar. 16, 2022, by Brogger et al., and titled Taggant Systems With Remotely Detectable Spectral Signatures.

(Continued)

*Primary Examiner* — Sonji N Johnson
(74) *Attorney, Agent, or Firm* — Kagan Binder, PLLC

(57) ABSTRACT

The present invention provides improved spectral signature strategies for use to confirm the authenticity of a substrate and associated documentation.

22 Claims, 14 Drawing Sheets

(56) References Cited

U.S. PATENT DOCUMENTS

| | | | |
|---|---|---|---|
| 4,089,995 | A | 5/1978 | Ferro et al. |
| 4,390,452 | A | 6/1983 | Stevens |
| 5,059,245 | A | 10/1991 | Phillips et al. |
| 5,135,569 | A | 8/1992 | Mathias |
| 5,172,936 | A | 12/1992 | Sullivan et al. |
| 5,314,767 | A | 5/1994 | Bussard |
| 5,380,695 | A | 1/1995 | Chiang et al. |
| 5,484,167 | A | 1/1996 | Donaldson et al. |
| 5,603,259 | A | 2/1997 | Gross et al. |
| 5,674,622 | A | 10/1997 | Burns et al. |
| 5,710,197 | A | 1/1998 | Fischer et al. |
| 5,829,789 | A | 11/1998 | Treleaven et al. |
| 6,153,123 | A | 11/2000 | Hampden-Smith et al. |
| 6,165,384 | A | 12/2000 | Cooper et al. |
| 6,165,592 | A | 12/2000 | Berger et al. |
| 6,375,864 | B1 | 4/2002 | Phillips et al. |
| 6,483,576 | B1 | 11/2002 | Gardner |
| 6,492,093 | B2 | 12/2002 | Gaschler et al. |
| 6,572,784 | B1 | 6/2003 | Coombs et al. |
| 6,632,783 | B1 | 10/2003 | Giblin et al. |
| 6,676,852 | B2 | 1/2004 | Brown et al. |
| 6,813,011 | B2 | 11/2004 | Gardner et al. |
| 6,861,012 | B2 | 3/2005 | Gardner et al. |
| 7,038,766 | B2 | 5/2006 | Kerns et al. |
| 7,122,076 | B2 | 10/2006 | Vonwiller et al. |
| 7,407,538 | B2 | 8/2008 | Jackson |
| 7,497,972 | B2 | 3/2009 | Lichtenstein et al. |
| 7,531,108 | B2 | 5/2009 | Hampden-Smith et al. |
| 7,547,894 | B2 | 6/2009 | Agrawal et al. |
| 7,674,532 | B2 | 3/2010 | Einhorn et al. |
| 7,773,162 | B2 | 8/2010 | Nendel |
| 7,903,281 | B2 | 3/2011 | Encrenaz et al. |
| 8,034,436 | B2 | 10/2011 | Wei |
| 8,159,657 | B2 | 4/2012 | Degott et al. |
| 8,330,122 | B2 | 12/2012 | Smith et al. |
| 8,360,323 | B2 | 1/2013 | Widzinski, Jr. et al. |
| 8,362,130 | B2 | 1/2013 | Demartin Maeder et al. |
| 8,822,954 | B2 | 9/2014 | Li et al. |
| 8,828,271 | B2 | 9/2014 | Zhang |
| 9,021,953 | B2 | 5/2015 | Barthram et al. |
| 9,162,513 | B2 | 10/2015 | Pawlik et al. |
| 9,342,999 | B2 | 5/2016 | Key |
| 9,444,981 | B2 | 9/2016 | Bellis et al. |
| 9,822,266 | B2 | 11/2017 | Okamoto et al. |
| 9,878,574 | B2 | 1/2018 | Merchant |
| 10,407,579 | B2 | 9/2019 | Yamanaka et al. |
| 2002/0025490 | A1 | 2/2002 | Shchegolikhin et al. |
| 2004/0151827 | A1 | 8/2004 | Argoitia et al. |
| 2005/0031838 | A1 | 2/2005 | Lagunwich et al. |
| 2005/0100204 | A1* | 5/2005 | Afzal .................. G07D 7/1205 |
| | | | 382/165 |
| 2005/0142342 | A1 | 6/2005 | Lutz et al. |
| 2005/0178841 | A1 | 8/2005 | Jones, II et al. |
| 2007/0029787 | A1 | 2/2007 | Loftin, III et al. |
| 2007/0119951 | A1 | 5/2007 | Auslander et al. |
| 2007/0205284 | A1 | 9/2007 | Ross |
| 2008/0006615 | A1 | 1/2008 | Rosario et al. |
| 2009/0033932 | A1 | 2/2009 | Gibson |
| 2009/0141961 | A1 | 6/2009 | Smith et al. |
| 2009/0251749 | A1 | 10/2009 | O'Boyle et al. |
| 2010/0242793 | A1 | 9/2010 | Greb et al. |
| 2010/0288943 | A1 | 11/2010 | Lambert |
| 2011/0127763 | A1 | 6/2011 | Benenati et al. |
| 2011/0283369 | A1* | 11/2011 | Green .................. B42D 25/333 |
| | | | 726/30 |
| 2012/0003071 | A1 | 1/2012 | Yoshimoto et al. |
| 2012/0133121 | A1 | 5/2012 | Bleikolm et al. |
| 2013/0153118 | A1 | 6/2013 | Friedrich |
| 2015/0223580 | A1* | 8/2015 | Kinney ................ B65D 25/205 |
| | | | 53/445 |
| 2015/0317923 | A1 | 11/2015 | Edmonds et al. |
| 2017/0032285 | A1 | 2/2017 | Sharma et al. |
| 2017/0076923 | A1 | 3/2017 | Yuan et al. |
| 2018/0075685 | A1 | 3/2018 | Hussain et al. |
| 2018/0197052 | A1 | 7/2018 | Yanson et al. |
| 2019/0236614 | A1 | 8/2019 | Burgin et al. |
| 2019/0370514 | A1 | 12/2019 | Lawandy |
| 2022/0258521 | A1 | 8/2022 | Brogger et al. |
| 2022/0334054 | A1 | 10/2022 | Brogger et al. |

FOREIGN PATENT DOCUMENTS

| | | | | |
|---|---|---|---|---|
| CN | 104830155 | A | 8/2015 | |
| CN | 104877433 | A | 9/2015 | |
| CN | 104893416 | A | 9/2015 | |
| DE | 10 2010 026 782 | A1 | 1/2012 | |
| EP | 0587178 | A2 | 9/1993 | |
| JP | 2005338656 | A | 12/2005 | |
| JP | 2008201065 | A | 9/2008 | |
| JP | 2012044614 | A | 8/2012 | |
| JP | 2012144614 | A | 8/2012 | |
| JP | 2013196165 | A | 9/2013 | |
| JP | 2015196819 | A | 11/2015 | |
| KR | 10-1038035 | A | 6/2005 | |
| KR | 10-1411063 | A | 8/2008 | |
| KR | 20130140340 | A | 12/2013 | |
| KR | 20170034600 | A | 3/2017 | |
| WO | 02/103659 | A1 | 12/2002 | |
| WO | 2015125224 | A1 | 8/2015 | |
| WO | 2016052641 | A1 | 4/2016 | |
| WO | 2017/201540 | A1 | 11/2017 | |
| WO | 2020/025696 | A1 | 2/2020 | |
| WO | 2020/263744 | A1 | 12/2020 | |
| WO | 2021/041688 | A1 | 3/2021 | |
| WO | 2021/055573 | A1 | 3/2021 | |
| WO | WO-2021048539 | A1 * | 3/2021 | ............. D21H 21/48 |
| WO | 2022/040304 | A1 | 2/2022 | |
| WO | 2022/266208 | A2 | 12/2022 | |

OTHER PUBLICATIONS

U.S. Appl. No. 17/622,013, filed Dec. 22, 2021, by Brogger et al., and titled Standardization of Taggant Signatures Using Transfer Images.

U.S. Appl. No. 17/637,638, filed Feb. 23, 2022, by Brogger et al., and titled Standardization of Taggant Signatures Using Transfer Images.

PCT/US22/33605, International Search Report and Written Opinion, ISA/US, date of mailing Dec. 2, 2022, total 6 pages.

G. Pfaff, "Special Effect Pigments," in High Performance Pigments, Wiley-VCH, 2002, pp. 77-101.

PCT/US2020/038946, International Search Report and the Written Opinion of the International Searching Authority, Sep. 24, 2020, 12 pgs.

PCT/US2020/051229, International Search Report and Written Opinion of the International Searching Authority, Feb. 4, 2021, 15 pgs.

PCT/US2021/046491, International Search Report and Written Opinion, mailed Aug. 12, 2021, 13 pgs.

PCT/US2020/048215, International Search Report and Written Opinion of the International Searching Authority, Dec. 7, 2020, 9 pgs.

Ruff Lukas et al., "A Unifying Review of Deep and Shallow Anomaly Detection", Proceedings of the IEEE, vol. 109, No. 5, ( May 2021) pp. 756-795, XP011851623, ISSN 0018-9219, doi 10.1109/JPROC.2021.3052449.

Alberto Signoroni et al, "Deep Learning Meets Hyperspectral Image Analysis: A Multidisciplinary Review", J. Imaging, 5, 52 (2019), pp. 1-32; www.mdpi.com/journal/ jimaging; doi 10.3390/ jimaging5050052.

Jinwon An et al, "Variational Autoencoder based Anomaly Detection using Reconstruction Probability", SNU Data Mining Center, 2015-2 Special Lecture on IE, pp. 1-18.

Sertac Arisoy et al, "Unsupervised Pixel-wise Hyperspectral Anomaly Detection via Autoencoding Adversarial Networks", ARXIV.ORG, Cornell Univ. Library, Jan. 21, 2021, pp. 1-6, doi 10.1109/LGRS. 2021.3049711.

EP Appln No. 22825741.6, Extended European Search Report (ESSR), European Patent Office, Feb. 20, 2025, 10 pages.

* cited by examiner

Illustrative spectrum

Wavelength (nm)

Illustrative Reflectance spectrum showing effect of infrared absorbing compound on reflectance

**STRATEGIES AND SYSTEMS THAT USE
SPECTRAL SIGNATURES AND A REMOTE
AUTHENTICATION AUTHORITY TO
AUTHENTICATE PHYSICAL ITEMS AND
LINKED DOCUMENTS**

PRIORITY CLAIM

This application claims the benefit from International Application No. PCT/US2021/046491, filed Aug. 18, 2021, which in turn claims priority to of U.S. Provisional Patent Application No. 63/067,639 filed on Aug. 19, 2020, titled "STRATEGIES AND SYSTEMS THAT USE SPECTRAL SIGNATURES AND A REMOTE AUTHENTICATION AUTHORITY TO AUTHENTICATE PHYSICAL ITEMS AND LINKED DOCUMENTS," the disclosures of which are hereby incorporated by reference in their respective entireties, for all purposes.

FIELD OF THE INVENTION

The disclosed embodiments are generally directed to spectral signature strategies that can be used to authenticate physical items and linked documents. In particular, the present invention relates to using spectral signatures and a remote authentication authority to authenticate the physical items and linked documents in order to detect if the linked items are authentic or have been counterfeited, altered, or otherwise modified without authority.

BACKGROUND OF THE INVENTION

Many documents, packages, products and product combinations are known in which it is useful to be able to automatically identify and/or authenticate the documentation, items or workpieces, or even content of such items or workpieces such as bar codes, so that appropriate automated processes, identification, authentication, inventory practice, pricing, remote data harvesting, or the like can be carried out. Examples of such products and product combinations include gemstones or jewelry (e.g., diamonds or the like) and grading documents; autographed sports memorabilia and certificates; art and certificates; alcohol and certificates; collectables and certificates; physical goods and shipping documents; vehicles or vessels and corresponding transport documents; real estate and survey documents; and the like.

Authentication is an issue in the gemstone industry. The gemstone industry is an illustrative example in which valuable gemstones, such as diamonds, are linked to associated documentation in the form of corresponding certificates (also referred to as grading reports in the gemstone industry, particularly with respect to diamonds). Such certificates or grading reports document the features and quality of the corresponding gemstones, respectively. In the diamond gemstone industry, grading reports are used to provide an identification and scientific blueprint of a stone's characteristics.

Illustrative examples of features of a particular diamond that are described on its corresponding certificate or grading report include one or more unique identification codes (e.g., an alphanumeric serial number and/or machine readable serial number such as a serial number in the form of a bar code, which may be encrypted) that uniquely identifies that particular diamond. The grading report may provide an assurance that the diamond is a natural diamond, with disclosure of any treatment to enhance color or clarity. The grading report also may provide expert analysis of one or more characteristics such as size, weight, clarity, imagery, cut, color, internal characteristics, grading, valuation, and/or the like. Among these, color, clarity, cut, and carat weight may be considered by some industry participants to be four primary characteristics of a diamond that contribute to its grading. A grading report also may provide one or more image(s) of the graded stone, a plotting diagram that clearly shows a diamond's inclusions and clarity characteristics, and/or the like. In addition, a grading report may provide information such as one or more of the stone's country of origin, the particular mine from which the stone was obtained, and assurance that the stone was ethically mined, or the like.

A certifying authority typically creates and/or approves a grading report and associates or links the grading report with the corresponding gemstone. Identification indicia on the gemstone product and documentation help to show and document this linking. Examples of certifying authorities in the gemstone industry include the American Gem Society, the Gemology Institute of America, EGL USA, and the International Gemological Institute.

Gemstones are not the same, and their values are not the same. The value of a gemstone such as a diamond depends to a large extent on the particular characteristics of that gemstone and its grading. Accordingly, the authenticity of a particular gemstone product and the authenticity of its linked documentation are important to help indicate the value of that gemstone product and the corresponding value added product. Even though grading reports typically include content indicative of quality, grading reports typically do not express a valuation in many instances. Yet, the documented quality in a report nonetheless is indicative of the valuation of the graded stone(s) and hence the valuation of the corresponding value added products into which the graded stone(s) are incorporated. The result is that the linked documentation in the form of a grading report provides information that often is vital to a confident purchase.

Unfortunately, gemstone products and the linked documentation are vulnerable to improper exploitation such as counterfeiting or unauthorized modification. A counterfeiter substitute a gemstone of lesser quality for the more valuable, authentic gemstone and trick someone into paying too much for the inferior, counterfeit product, A counterfeiter also may replace authentic documentation with counterfeit documentation that is falsified with more favorable information to make a gemstone appear to be more valuable. There is a strong need in the gemstone industry, as well as in other industries, to be able to reliably authenticate products and theft associated documentation and be able to confirm the link between the two.

SUMMARY OF THE INVENTION

The present invention provides improved spectral signature strategies for use to confirm the authenticity of a substrate (such as an object, product, equipment, structure, package, label, etc.), associated documentation, and the link between the two. In one aspect, the present invention provides a method of providing authentication information for an authentic substrate and authentic, associated documentation, comprising the steps of:

a. providing at least one identification code associated with the authentic substrate;

b. providing at least one identification code associated with the associated, authentic documentation;

c. providing a taggant key on the associated, authentic documentation, said taggant key providing spectral characteristics responsive to illumination by at least one light source, wherein a spectral signature is encoded in the spectral characteristics of the taggant key;

d. storing a record in a database, wherein the record stores authentication attributes of the authentic substrate and the associated, authentic documentation in fields comprising the identification code associated with the authentic substrate, the identification code associated with the associated, authentic documentation, and the taggant key provided on the associated, authentic documentation; and e. providing functionality that allows information harvested from an evaluated substrate and an evaluated document to be compared to the authentication attributes stored in the fields of the record in order to help evaluate if the evaluated substrate and/or the evaluated document is a match for the authentic substrate and/or the associated, authentic documentation.

In another aspect, the present invention relates to a method to evaluate the authenticity of an evaluated object and an evaluated document, comprising the steps of:

a. associating at least an identification code directly or indirectly to an authentic object (e.g., an association may occur such as by affixing the code to the object itself or indirectly to the object such as to packaging or label, etc. that houses the object affixes the keys to the object via the packaging) and associated a taggant key and an identification code to associated, authentic documentation and, wherein:

i. the presence of the taggant key and the identification codes on the evaluated object and the evaluated document provides an indication that the evaluated object and/or the evaluated document are authentic;

ii. the taggant key produces spectral characteristics responsive to illumination by at least one light source, wherein a spectral signature is encoded in the spectral characteristics of the taggant key; and iii. the identification codes comprises readable indicia that help to identify the authentic object and the associated, authentic documentation; and b. causing authentication information for the authentic object and the associated, authentic documentation to be stored in a local and/or remote information repository, wherein:

i. said authentication information comprises a record in the local remote information repository, said record storing attributes of the authentic object and the associated, authentic document in a plurality of fields, said stored attributes including information indicative of the associated identification codes and the taggant key; and ii. said authentication information is guarded by a security protocol that comprises the steps of:

1. determining if the taggant key and/or the identification codes for the authentic object and the authentic document are present on the evaluated object and the evaluated document;

2. preventing access to the authentication information if any of the taggant key and the identification codes are not present on the evaluated object and the evaluated document; and 3. allowing access to the authentication information if all of the taggant key and the identification codes are present on the evaluated object and the evaluated document.

An authentication system, comprising:

a. a plurality of, unique, authentic identification codes, each unique, authentic code of said plurality comprising unique, observable indicia that distinguishes each unique, authentic identification code from the other unique, authentic identification codes of said plurality;

b. a plurality of unique, authentic taggant keys, wherein:

i. each unique, authentic taggant key of the plurality is associated with one or more of the unique, authentic identification codes; and ii. each unique, authentic taggant key produces spectral characteristics responsive to illumination by at least one light source, wherein a unique spectral signature is encoded in the spectral characteristics of each unique, authentic taggant key that distinguishes each unique, authentic taggant key from the other unique, authentic taggant keys in said plurality;

c. a spectral analysis key that comprises an algorithm that processes detected spectral characteristics in a manner effective to determine if a unique, authentic spectral signature of a unique, authentic taggant key is encoded in the detected spectral characteristics;

d. an authentic object comprising at least one of the unique, authentic identification codes and an associated, authentic document comprising at least one of the unique, authentic taggant keys and at least one of the unique, authentic identification codes;

e. an information repository that securely stores authentication information for the authentic object and the associated, authentic document, said authentication information including authentication information indicative of the at least one unique, authentic taggant key and the unique identification codes for the authentic object and the associated, authentic document; and f. information repository security programming that comprises the steps of:

i. determining if the at least one unique, authentic taggant key and/or the at least one unique, authentic identification code for the authentic document is present on an evaluated document;

ii. preventing access to the authentication information if any of the at least one unique, authentic taggant key and the at least one unique, authentic identification code of the authentic document is not present on the evaluated document; and iii. at least partially confirming that the evaluated document is authentic if the at least one unique, authentic taggant key and the at least one unique, authentic identification code are present on the evaluated document.

BRIEF DESCRIPTION OF THE DRAWINGS

FIG. 2b schematically illustrates an alternative embodiment of the product package of FIG. 2a.

DETAILED DESCRIPTION OF PRESENT PREFERRED EMBODIMENTS

The present invention will now be further described with reference to the following illustrative embodiments. The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

Figure 1:
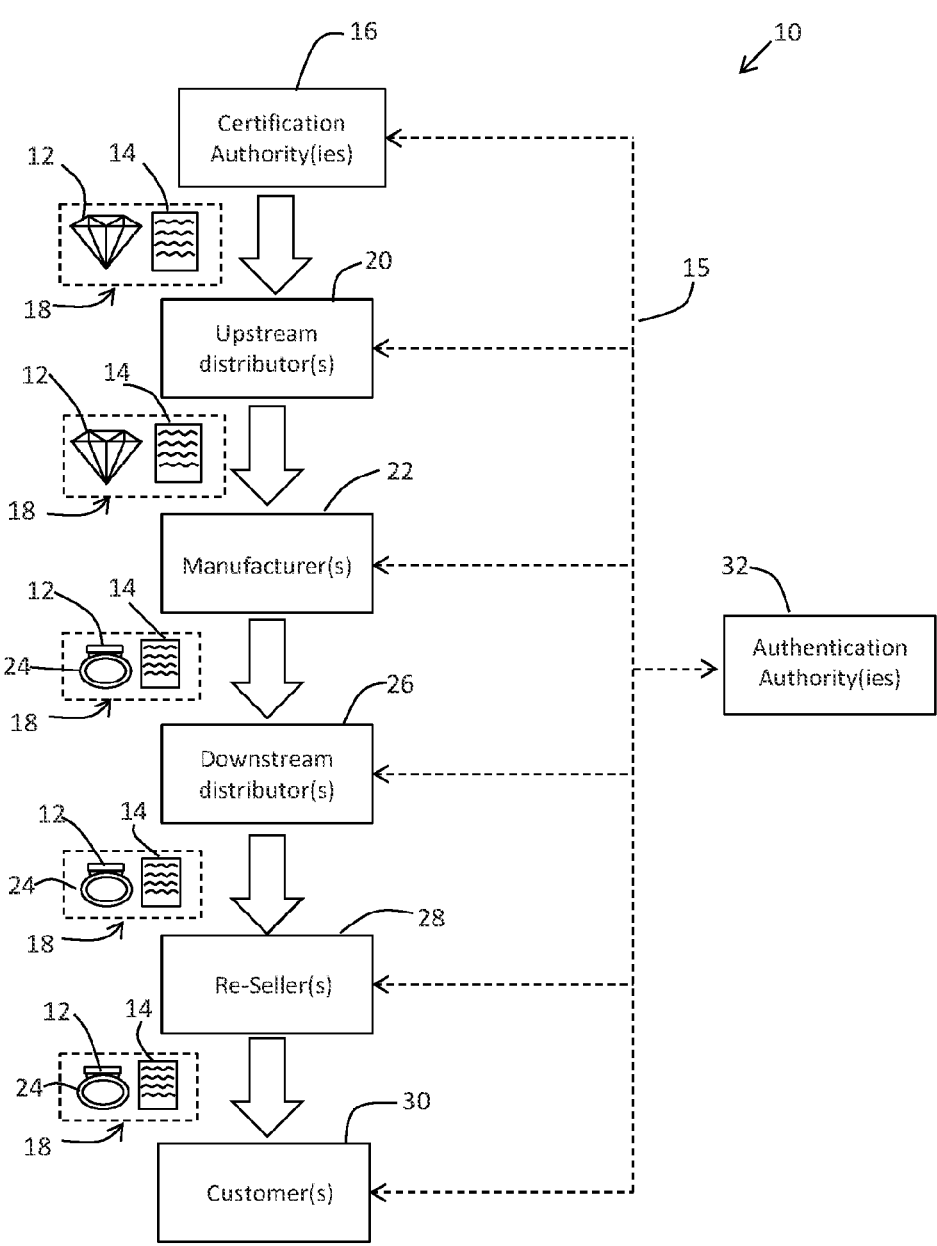
FIG. 1 shows an illustrative marketplace channel of distribution in the gemstone industry in which strategies of the present invention are used to help authenticate product packages including gemstones and linked certification documents.

The principles of the present invention may be practiced to help authenticate a wide range of substrates, documentation and the link between the two in a wide range of settings. The principles of the present invention may be used to help determine if the objects (also substrates) and/or documentation are authentic or have been counterfeited, altered, or otherwise modified without authority. FIG. 1 shows an exemplary marketplace channel of distribution 10 in which authentication of products 12 and their linked documentation 14 is desired by marketplace participants. Marketplace participants include, for example, distributors 20 and 26, manufacturers 22, re-sellers 28, and/or customers 30. As used herein, the combination of a product 12 and its linked documentation 14 is referred to as a product package 18. Documentation 14 helps to document, certify, or otherwise indicate characteristics of the product 12. For purposes of illustration, products 12 are in the form of a valuable gemstone in the form of a diamond, and the corresponding linked documentation 14 is in the form of corresponding certificates (also referred to as grading reports in the gemstone industry, particularly with respect to diamonds). As an alternative to a diamond, product 12 may include any one or more precious or semi-precious minerals or gemstones such as rubies, sapphires, emeralds, pearls, jadeite, alexandrite, musgravite, red beryl, opal (e.g., black opal), tanzanite, and/or the like. Other examples of semi-precious and precious minerals and gemstones are included in an alphabetical listing provided by the International Gem Society in a Learning Center included at www.gemsociety.org/gemstone-encyclopedia/.

FIG. 1 shows that a certifying authority 16 creates and/or approves the documentation 14 and associates or links particular documentation with the corresponding gemstone product 12. Identification indicia (described further below with respect to FIG. 2a) on the gemstone product 12 and documentation 14 help to show this linking.

After a gemstone product 12 and its documentation 14 are linked to provide the corresponding product package 18, the resulting product package 18 is introduced to the downstream portion of the channel of distribution 10. In an illustrative downstream scenario, the certifying authority 16 delivers the product packages 18 to one or more upstream distributors 20 who then distribute the product packages 18 to one or more manufacturers 22 who incorporate the documented gemstone products 12 into further value added products 24 such as jewelry items (rings, bracelets, earrings, watches, cufflinks, tiaras, pendants, diadems, pins, bangles, brooches, anklets, chains, breastplates, amulets, etc.). For purposes of illustration, value added products 24 are in the form of rings incorporating the gemstone products 12. The result is that the product packages 18 now include the value added product 24 including the gemstone product 12 as well as the linked documentation 14.

The manufacturers 22, in turn, supply the value added products 24 and the corresponding documentation 14 to one or more downstream distributors 26, The downstream distributors 26 then distribute the value added products 24 and corresponding documentation 14 to re-sellers 28, who in turn sell the value added products 24 to customers 30, Because the value added products 24 remain linked to the corresponding documentation 14, the documentation 14 associated with products 12 incorporated into the value added products 24 may be reviewed at any step of the chain of distribution 10 to help evaluate the quality of the products 12 and 24, as the case may be.

Because the products 12 and the documentation 14 are vulnerable to exploitation such as by counterfeiting or unauthorized modification, marketplace participants throughout the channel of distribution 10 may desire to confirm the authenticity of a gemstone product 12, and/or its corresponding documentation 14 and the link between the two to make sure that the participant purchases and/or sells the gemstone for appropriate value. Advantageously, the features of the present invention allow market participants at different points of the channel of distribution 10 to communicate via communication network 15 with a local and/or remote authentication authority 32 in order to confirm the authenticity of a product 12 and its corresponding documentation 14. The authentication authority 32 may have functionality incorporated into a local computing device such as a computer or smart phone. Alternatively, some or all of the functionality of the authentication authority 32 may be incorporated into a remote computer system that may be accessed remotely.

The present invention uses information obtained from the product 12 and documentation 14 as well as information securely stored by the authentication authority 32 in order to implement a desired evaluation such as an authentication. In some modes of practice, the authentication authority 32 receives and transmits information allowing authentication to be undertaken at the site where the product 12 and/or documentation 14 are located. In other modes of practice, the authentication authority 32 receives information to remotely undertake the authentication analysis and transmits output information indicative of whether the item(s) are authentic.

Figure 2A:
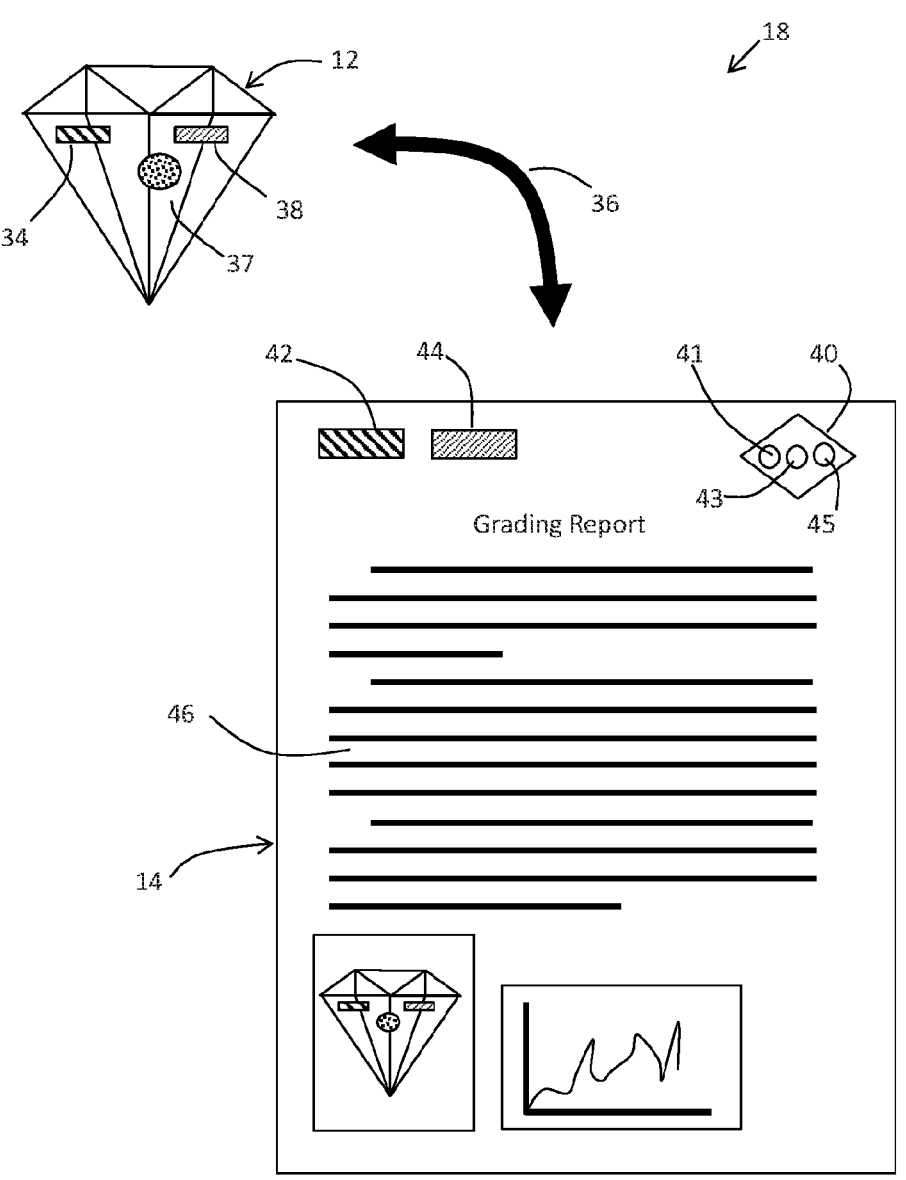
FIG. 2a schematically illustrates the features of a product package of FIG. 1 in more detail.

FIG. 2a shows more details of the features of product package 18 that facilitate using authentication strategies of the present invention. For purposes of illustration, product 12 is in the form of a diamond gemstone. A unique identification code 34 is provided on product 12. This identification code 34 often is in the form of an alphanumeric character string. Unique identification code 34 helps to distinguish this particular diamond gemstone from other gemstones, some of which would have their own unique identification codes, respectively, or even no code.

The code 34 may be provided on product 12 in different ways. Exemplary methods include etching, laser scribing, and the like. Desirably, and in accordance with well-known industry practices, the code 34 is formed in a very small size such that the code 34 is not readable with the unaided human eye. This way, the placement of the code 34 does not unduly interfere with the appearance or enjoyment of the gemstone. For example, an industry practice uses a laser to engrave a microscopic code onto the product 12, such as on the girdle of a diamond gemstone. A magnifying viewer (not shown in FIG. 2a) such as one with at least 10× magnification, or even at least 20× magnification, or even at least SOX to 200× magnification may be used to read the code 34. The code 34 helps to provide a way to uniquely identify the product 12 and to link the product 12 to its corresponding documentation 14. The link 36 schematically shows that the product 12 and the documentation 14 correspond to each other in the sense that information on documentation 14 describes the linked product 12 or that the identification code(s) (e.g., a bar code) and spectral code are linked or paired. The linking or pairing of information or items may be provided by local and/or remote database(s).

As an optional feature, gemstone product 12 may further include an additional machine readable code 38 provided on product 12 in a similar manner to how code 34 is formed. That is, the code 38 also may be microscopically formed such as by laser engraving and would be viewable with a suitable magnifying viewing device. Code 38 in machine-readable form may provide the same serial number as code 34. Alternatively, and for extra security, the code 38 may provide a second, unique serial number and/or other information that helps to uniquely identify product 12. Code 34 and Code 38 cooperatively work to help link gemstone product 12 to documentation 14 as well as to securely guarded, corresponding information in the authentication authority 32 (FIG. 1).

In some embodiments, machine-readable code 38 is in the form of a bar code or spectral signature. In some embodiments, the code 38 may include a bar code and an additional machine readable code 37 in the form of a spectral signature 37 also may be provided. A spectral signature 37 may be provided, for example, by one or more taggants as discussed below. Spectral signature 37 may be the same or different from a spectral signature 40 provided on documentation 14. For purposes of illustration, machine-readable code 38 is in the form of a bar code.

Bar codes may be encrypted if desired so that, even if the bar code itself can be viewed and copied, the information stored in the code cannot be read and understood without proper decryption. Bar codes in the practice of the present invention may be linear or multi-dimensional such as 2D or 3D bar codes. The Universal Product Code (UPC) is one example of a linear bar code. The UPC code often includes a barcode that encodes a 12-digit UPC number. Six of these digits indicate the manufacturer ID number. The next 5 digits represent the product number. The final digit is a check digit that is used to determine if the code is read properly. A linear barcode such as one that uses the UPC code often encodes mainly alphanumeric information.

A 2D barcode includes a visual pattern in one or more two-dimensional arrays. Often, such an array is square or rectangular, but other shapes may be used. Just like a linear barcode, a 2D bar code encodes imagable data in the form of a machine readable, visual pattern. In contrast to a linear bar code, a 2D barcode can encode substantially more data per unit area. In other words, a 2D barcode stores information at a higher storage density than a linear barcode. Also a 2D bar code may encode data redundancies to minimize data loss if a portion of the bar code is damaged. A 2D bar code also may encode error correction for more reliable reading. A typical 2d bar code also can be read regardless of orientation.

There are several kinds of 2D barcodes. Examples of popular 2D barcodes include OR Code (which includes micro OR Code, KIR Code, SQRC, and FrameQR Code); Aztec code; MaxiCode; PDF417 code, and Semacode. One or more of these and/or other 2D barcodes may be used to form all or a portion of image 38.

In practice, a linear or 2D barcode is read by using an imaging device (not shown in FIG. 2a) to capture an image of the barcode. A suitable algorithm is then used to decode the imagable data encoded in the image. In some cases, the decoding functions and the imaging functions may be incorporated in whole or in part into the imaging device itself. Alternatively, after image capture, the image information can be transmitted in whole or in part via a suitable communication pathway to another device or system, such as the remote authentication authority 32 (FIG. 1), in order to handle decoding to interpret the imagable data stored in code 38

For purposes of illustration, the documentation 14 shown in FIG. 2a is in the form of a gemstone grading report linked (schematically shown by linkage 36) to product 12 (e.g., a diamond gemstone). Documentation 14 includes identification code 42 that is the same as or paired/linked to code 34 on the product 12. The match/pairing/linking (as appropriate) between codes 34 and 42 show that the product 12 and 14 are linked. As an option, the grading report also may include a machine-readable code 44 that is the same as code 38 on the product 12. This additional match between codes 38 and 44 also helps to show that the product 12 and product 14 are linked together. A mismatch between codes 38 and 44 and/or between codes 34 and 42 would indicate that the product 12 and documentation 14 are not properly linked, that an alteration of one or both of product 12 or documentation has occurred, or that there may be a counterfeit issue.

In addition, documentation 14 includes information 46 relating to the gemstone 12. In some embodiments, information 46 may be any portion(s) or all of the information as described above with respect to the content of grading reports as discussed with respect to FIG. 1. The information 46 also may identify the certifying authority 16, Desirably, information 46 may include not only textual information but also one or more images of all or a part of gemstone product 12 to allow the gemstone product 12 and documentation 14 to be visually matched as well as matched by the identification codes 34, 38, 42 and/or bar code 44.

An unfortunate reality is that the codes 34, 38, 42, and/or 44 are susceptible to unauthorized copying, even if any of these are encrypted in some fashion. Advantageously, the present invention provides strategies that help make it easier to authenticate product package 18 and its constituent product 12 and documentation 14 or to quickly identify improper or unmatched items. This is accomplished in part by incorporating a spectral taggant key 40 into the documentation 14 while also securely storing matching and/or additional authentication information locally or remotely in the authentication authority 32 (FIG. 1 and described further below). Spectral taggant key 40 can be read by a spectrometer, spectral reader, or other suitable detector device depending on the nature of the spectral taggant key 40. As an option, a similar or different taggant signature (not shown) also could be placed on the associated object, which in this illustration is the gemstone 12. Other objects that may be associated in a similar manner with corresponding documentation include sports memorabilia, other physical goods, vehicles or vessels, real estate, and the like. Secure access to the remote authentication information stored in the authentication authority 32 is allowed only if taggant key 40 providing a proper taggant signature corresponding to the codes 34, 38, 42, and/or 44 is detected on documentation 14.

Taggant key 40 may include one or more taggant compounds, preferably 2 or more taggant compounds, and even three or more taggant compounds to provide a desired spectral signature. In some embodiments, the taggant key 40 includes from 1 to 25 taggant compounds, preferably 2 to 10 taggant compounds. For purposes of illustration, taggant key 40 is shown as including a combination of taggant compounds 41, 43, and 45.

Figure 2B:
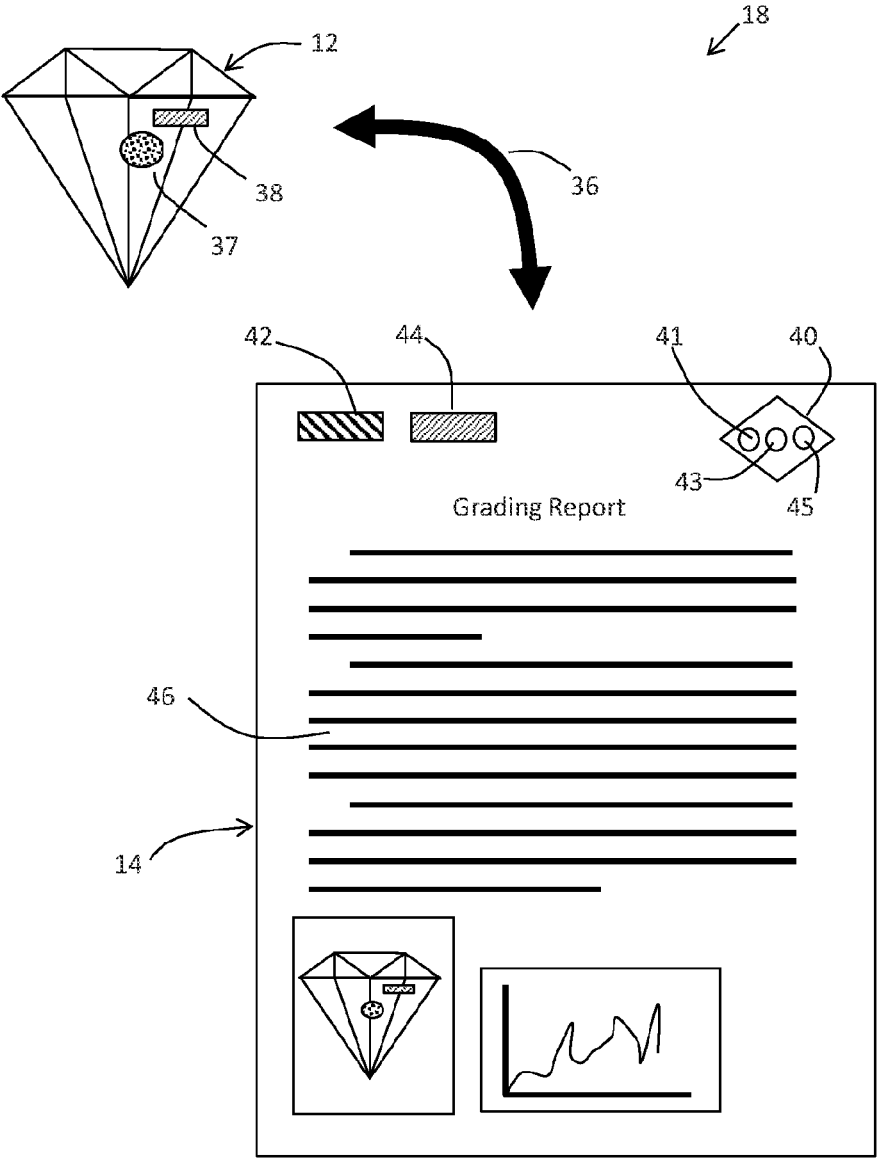

Taggant key 40 may be provided in a variety of different ways. According to one alternative, one or more taggant inks, each incorporating one or more of the taggant compounds 41, 43, and/or 45, is printed onto documentation 14. As described in Assignee's Co-pending Applications, optional primer, base coats, and top coats may be incorporated into taggant key 40 to enhance one or more of adhesion to the underlying substrate, readability, durability, and the like, FIG. 2b shows an alternative embodiment of the product package 18 of FIG. 2a. FIG. 2b is identical to FIG. 2a except that product 12 in FIG. 2b includes the code 38 but does not include the code 34. To the extent a serial number is linked or paired to product 12, such a serial number could be embedded in the code 38.

Figure 3:
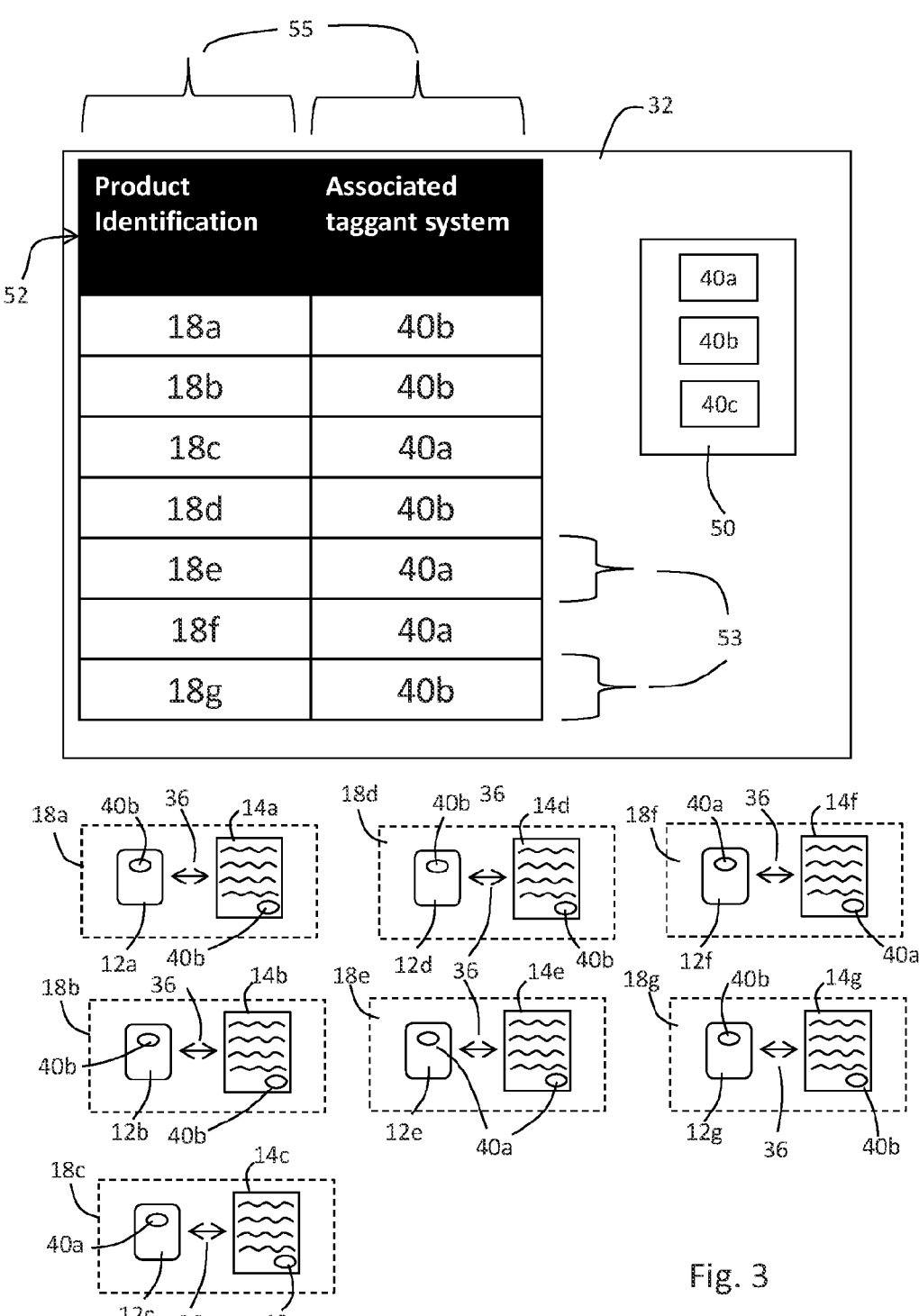
FIG. 3 schematically illustrates how a plurality of different taggant keys from a taggant key library are used to mark product packages of FIGS. 1 and 2.

FIG. 3 schematically illustrates how authentication authority 32 includes a taggant library 50 that stores information relating to different taggant keys 40a, 40b, and 40c. For purposes of illustration, library 50 includes three different taggant keys 40a, 40b, and 40c, but in actual practice, library 50 may include only a single or two taggant keys or a greater number of taggant keys such as from 4 to 1000, or even 10,000 or even more taggant keys, each providing a unique spectral signature that differs from the spectral signatures of the other taggant keys in library 50. Similarly, FIG. 3 shows only 7 different product packages 18a to 18g, but in actual practice, a lesser number or even a greater number such as tens, or even hundreds, or even thousands, or more of different product packages may be associated with corresponding taggant keys on an annual basis.

In FIG. 3, authentication authority 32 includes a database 52 including at least a field for product identification and a field for the taggant key 40a, 40b, or 40c, as the case may be, associated with the identified product 18a to 18g. For purposes of illustration, the data is shown as being stored in a table format in which each row is a record 53 (also known as a tuple in the database industry) for a product and information about each product package 18a to 18g, respectively, is stored in fields (also known as attributes), In other words, each row is a dataset for each product package, and each column is a dataset for each field 55. Database 52 may store and allow access to information using relational database strategies by which strategies such as SQL (structured query language) may be used to query and maintain the database. Information may be output as a view (also a result set or or a derived relvar) responsive to a query.

Thus, database 52 links each product package 18a-18g to at least one corresponding taggant signature 40a-40c. In practice, a user would read a taggant signature (if any) on a product package 18a-18g under evaluation. The user would read the signature using a suitable detection device such as a spectrometer or other suitable detector. Local and/or remote computing functionality of the system would evaluate the signature to determine if the taggant signature is authentic and from information in database 52 is properly linked to the product package at issue. This evaluation may occur by applying a suitable spectral model to the spectral data, To preserve secrecy and protect against counterfeiting, the spectral model may be maintained in confidence by the authentication authority 32. Using two part encryption as an analogy, the secret spectral model is like a private decryption key known only to the authentication authority in such a mode of practice. Hence, only the authentication authority 32 would be able to authenticate the signature and match it to the corresponding product package.

FIG. 3 shows how the taggant keys 40a and 40b are physically incorporated into taggant key on one or more of the product packages 18a to 18g. Each of the product packages 18a through 18g includes a corresponding product 12a through 12g, respectively, and corresponding documentation 14a to 14g, respectively. The association of each product 12a to 12g and its associated documentation 14a to 14g is shown by the links 36. The taggant keys 40a and 40b are used among the product packages 18a to 18g. Taggant key 40c has not yet been assigned to one or more product packages, but remains available for use in library 50 when desired.

In this illustration shown in FIG. 3, each of the taggant keys 40a and 40b is linked to more than one product package. Thus, in the practice of the present invention, a single taggant key can be used to securely authenticate the product and/or documentation components of more than just one product package 18. In other modes of practice, a particular taggant key might only be linked to a single, corresponding product package so that each product package in a product line or group bears a unique spectral signature relative to the spectral signatures used on other product packages of the line or group. In other modes of practice, two or more different taggant keys 40a, 40b, and/or 40c from library 50 may be associated with a particular product package for even more security.

The fields incorporated into database 52 of authentication authority 32 may be grouped into categories including into authentication fields and harvested fields. Authentication fields include data securely stored in the database 52 and that are properly associated with authentic items. For example, representative authentication fields of securely stored authentication information may include one or more of a field for each of the proper codes 34, 38, 44, and/or 48 (FIG. 2a), respectively, at least one or more fields storing proper images of a product, at least one or more fields storing proper images of associated documentation, one or more fields storing proper information content of the documentation, one or more fields identifying one or more taggant keys 40*a*, 40*b*, or 40*c* properly associated with a product package, a field identifying the proper associated authentication authority, one or more fields showing the proper chain of title or custody information, one or more fields including proper images of the associated value added product 24. There may also be date fields to show the date(s) on which data is stored or updated in authentication fields. One or more fields also may be used to control user access. The harvested fields may include these same field types except that the data stored in the harvested fields is obtained as a result of user(s) in the field undertaking an evaluation of a product, documentation, or value added item.

From one perspective, the securely stored information in the authentication fields is relatively static and fixed for an item and is only changed to reflect an actual, authorized change to an authentic item. The harvested information stored in the harvested fields may be viewed as being dynamic, as it is gathered during an evaluation and may change and be updated each time and to the extent an evaluation is carried out.

The database 52 also may be programmed to perform desired functionality. For a database record, for example, harvested information stored in the harvested fields may be compared to the corresponding data stored in authentication fields in order to control access to the database functionality, to allow input or updating of stored information, to perform authentication evaluations, to harvest supplemental information (described below) from an evaluation event, and the like. Additionally, comparison between data stored in authentication fields with data stored in one or more harvested fields helps to evaluate the authenticity of one or more items. If the harvested information matches the authentic information, authenticity tends to be confirmed. A mismatch would indicate an authenticity issue. For example, such a comparison may be undertaken to determine if detected identification code(s) match the securely stored code(s) and if the detected spectral signature(s) match the securely stored spectral signature(s). If both the harvested codes and harvested signatures match their securely stored counterparts, the authenticity of the codes can be confirmed to then allow further evaluations, database access, or other functionality to occur.

Unfortunately, the identification indicia (e.g., unique serial number(s) and/or unique bar code(s)) incorporated into the product 12 and the linked documentation 14 might be easy to copy, counterfeit, or otherwise modify. In contrast, a spectral signature is easily read by users with an appropriate reader (also referred to as a detector), and yet many embodiments of a spectral signature are very difficult to counterfeit. Hence, including the spectral signature in the evaluation strategies of the present invention enhances the ability to undertake accurate evaluations of authenticity. Consequently, although the spectral signature of each of the taggant keys 40*a*, 40*b*, and 40*c* is easily detected and observed by a user, the taggant keys 40*a* to 40*c* provide secure keys that can be used as part of the authentication analysis because the strategies to create the keys are secret. Hence, the presence of a proper, associated taggant key 40*a*, 40*b*, and/or 40*c* on a product 12*a*-12*g* and/or documentation 14*a*-*g* under evaluation provides a way to authenticate that information on the product 12 and/or documentation 14 are authentic and properly associated.

Also, other harvested image or content information can be compared to securely stored counterpart information in order to determine if the harvested information matches the authentication information. For example, additional authentication information stored in the applicable record of database 52 also may be matched to the actual, harvested features of the product 12, documentation 14, and/or value added product 24 as additional strategies to establish that the product 12, documentation 14, and/or value added product 24 are authentic. For example, images of the product 12, documentation 14, and/or value added product 24 should match images stored in database 52. A match would help to confirm authenticity. A mismatch would indicate an authenticity problem. Based on the comparisons undertaken in steps 92 and/or 93, in step 95, a determination is be made as to whether one or more of the product 12, documentation 14, and/or value added product 24 are authentic.

Figure 4:
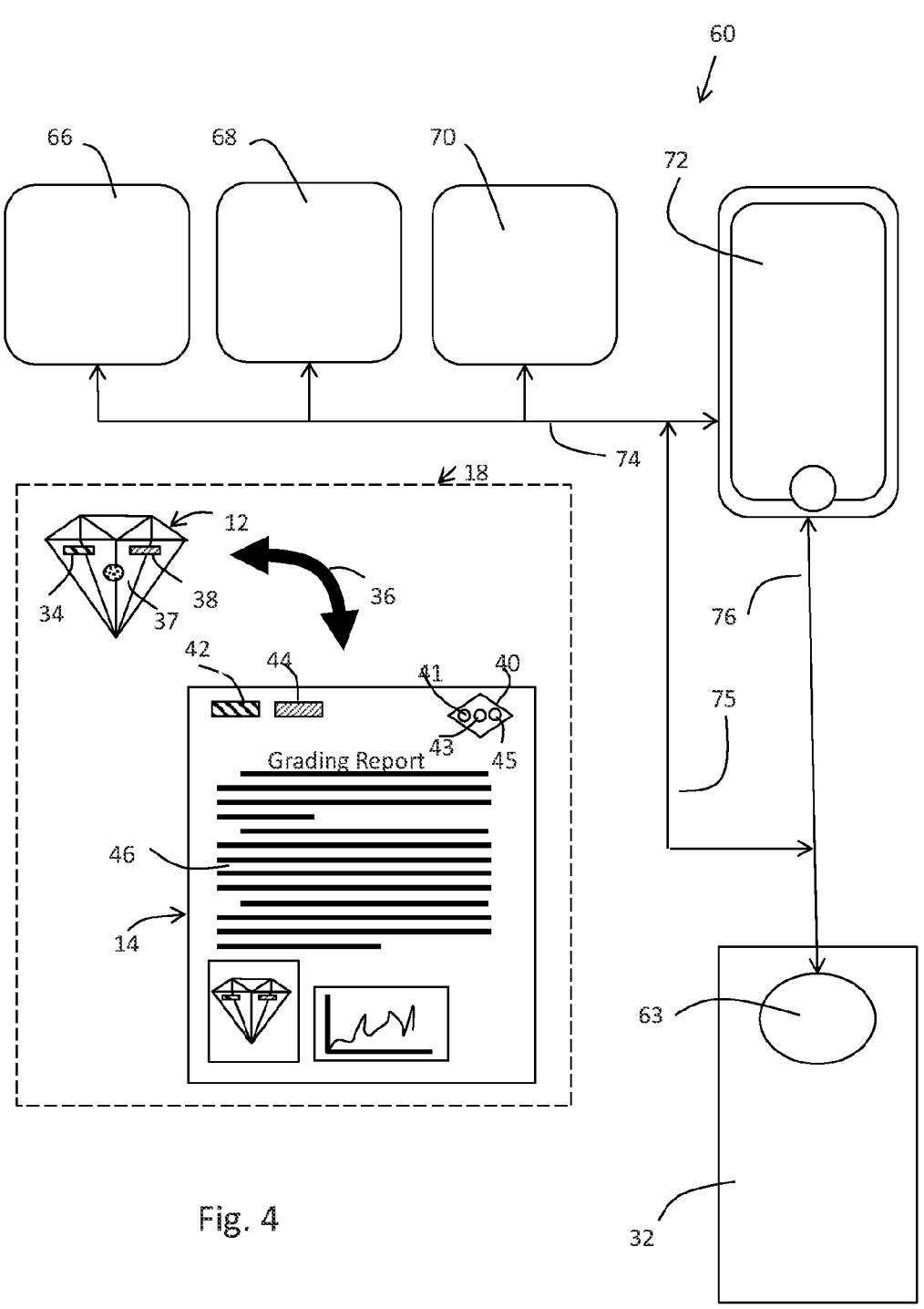
FIG. 4 schematically shows how users harvest information from a product package of FIG. 1 that can be used to authenticate the constituents of the product package.
Figure 5:
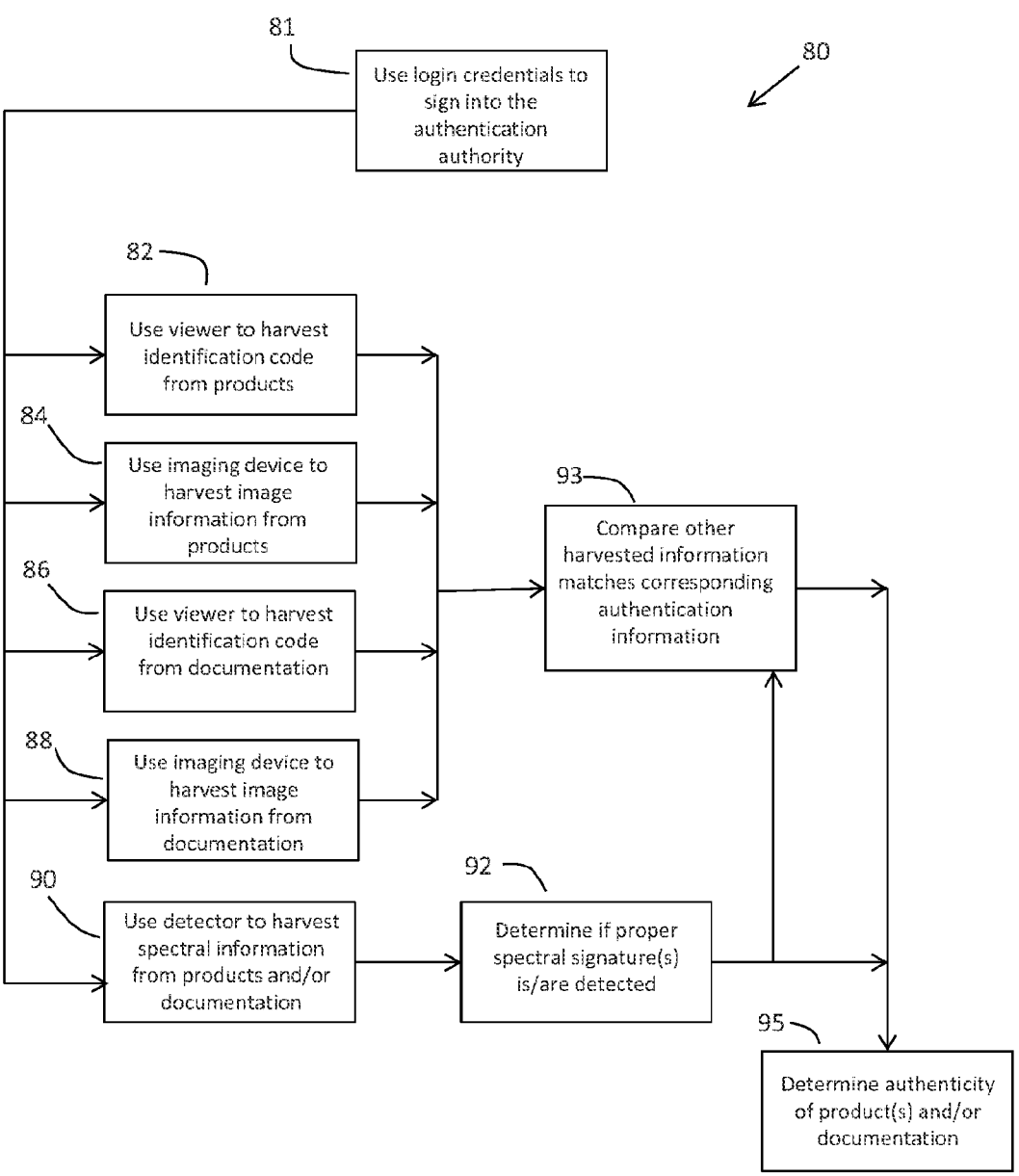
FIG. 5 schematically shows a methodology used by the users of FIG. 5 to authenticate the product package under evaluation.

FIGS. 4 and 5 schematically show a first aspect of an authentication scenario 60 (FIG. 4) and corresponding evaluation methodology 80 (FIG. 5) according to the present invention in which the authenticity of a diamond gemstone product 12 as well as associated documentation 14 of product package 18 of FIG. 2*a* are being evaluated for authenticity by users such as a seller 28 and customer 30 (see FIG. 1). In this scenario, the customer seeks confirmation that the gemstone product 12 is in fact the authentic gemstone product 12 being described in documentation 14. The customer also seeks confirmation that the information on the documentation 14 is properly associated with product 12 and is authentic. These confirmations would allow the customer to have confidence that neither product 12 nor documentation 14 has been counterfeited, falsified or otherwise improperly modified or altered.

As tools to carry out the methodology 80 of FIG. 5, FIG. 4 shows that the seller and customer are able to use a magnifying viewer 66, an imaging device such as a bar code scanner 68, and a spectral signature detector 70 to read the codes, spectral signatures, and/or features of the product 12 and documentation 14. The hardware and/or software functionality to evaluate the information that is harvested by reading such features may be incorporated into local and/or remote computing systems such as the local computing device 72 shown for purposes of illustration as a smart phone or the remote authentication authority 32.

Viewer 66, imaging device 68, and detector 70 are shown as separate instruments. However, in other modes of practice, the functions of two or even all three of these instruments may be integrated into a single unit. The information and functionalities incorporated into a local computing system 72 and/or remotely into the database 52 of remote authentication authority 32 of FIGS. 1 and 3 provide further took to use for evaluations of the information harvested by the viewer 66, imaging device 68, and the detector 70. The local computing device 72 and authentication authority 32 may communicate with each other and/or the viewer 66, imaging device 68, and detector 70 via wired or wireless communication paths 74, 75 and 76. Computing device 72 may be any suitable computing device such as a desktop computer, a terminal connected to remote computing functionality, or a mobile computing device such as a smartphone, notebook computer, tablet device, or the like. In this scenario, the computing device 72 is a smartphone.

As shown by methodology 80 of FIG. 5, the seller and/or customer may carry out a number of steps in parallel or in any order in order to harvest information from the products 12 and/or 24 as well as documentation 14 to carry out an authentication evaluation. In step 81 the seller and/or customer use their secure login credentials to sign into authentication authority 32 via a secure access interface 63 of authentication authority 32. The kind of information, user rights, and functions allowed to each user may depend on the user class to which the user belongs. For example, the customer may only have rights to transmit information to the authentication authority 32 and then to receive back merely an indication of authenticity without any other secure information being provided to the customer. The seller may have these rights as well as further rights such as to receive and view authentication information with respect to product 12 and documentation 14, but only if a proper taggant signature associated with the identification codes 34, 38, 42, and/or 44 (FIG. 2a) on the product 12 and documentation 14 have been detected. The seller also may be able to upload and download seller-specific information stored in authentication authority 32 such as sales, seller, customers, sales prices, location of sales, products sold, dates of sales, and the like. Such information may be stored in corresponding fields for the associated records. Authentication authority 32 also may interface with one or more of the tools identified in FIG. 4 to automatically harvest some or all of the information needed for the evaluation.

In steps 82 and 84, the user, and/or authentication authority 32 as the case may be, harvests information from products 12 and/or 24 that can be used to help authenticate, identify, or otherwise document features of products 12 and/or 24 as well as documentation 14. For example, in step 82, the seller and/or customer may use viewer 66 to observe the identification code 34 on product 12. Viewer 66 may use magnification to allow the code 34 to be observed. The detected code 34 may then be automatically transmitted upon detection to computing device 72 or manually input by the user into an interface on computing device 72, Computing device 72 then transmits the code 34 to the authentication authority 32. As an alternative to code transmission, imaging device 68 may capture an image of the code 34 and automatically transmit the resultant image information to the computing device 72, which may include functionality to determine code 34 from the image information. Alternatively, computing device 72 may transmit the image information to the authentication authority 32 via the computing device 72. Then, authentication authority 32 includes functionality that determines the code 34 from the image information. The code 34 is stored in a memory in the authentication authority until sufficient information is harvested from products 12 and/or 24 and documentation 14 to carry out the authentication evaluation of methodology 80.

In step 84, imaging device 68 is used to capture an image of the machine-readable code 38 on the product 12. The image information may be transmitted to computing device 72 for decoding directly or indirectly (such as via computing device 72) to authentication authority 32 for decoding. Alternatively, device 68 may decode the image and send the decoded information directly or indirectly to authentication authority 32. As an optional aspect of step 84, additional image information of product 12 may be transmitted to authentication authority 32 in order to provide more information about the actual product 12 to be used for authentication. This may include images of the product 12 from different sides, a top view, a bottom view, close up views, views under particular illumination (e.g., under LED illumination at one or more particular wavelengths), and/or the like. The code 38 and other image information, if any, is stored in a memory in the authentication authority until sufficient information is harvested from products 12 and/or 24 and documentation 14 to carry out the authentication evaluation of methodology 80.

In steps 86, 88, and 90, the user harvests information from documentation 14 that can be used to help authenticate, identify, or otherwise document features of not only documentation 14 but also products 12 and/or 24. For example, in step 86, the seller and/or customer may use viewer 66 to observe the identification code 42 on product 12. Viewer 66 may use magnification to allow the code 34 to be observed by the user. The detected code 34 may then be automatically transmitted upon detection to computing device 72 or manually input by the user into an interface on computing device 72. Computing device 72 then transmits the code 34 to the authentication authority 32. As an alternative to code transmission, imaging device 68 may capture an image of the code 34 and automatically transmit the resultant image information to the computing device 72, which may include functionality to determine code 34 from the image information. Alternatively, computing device 72 may transmit the image information to the authentication authority 32 via the computing device 72. Then, authentication authority 32 includes functionality that determines the code 34 from the image information. The code 34 is stored in a memory in the authentication authority until sufficient information is harvested from products 12 and/or 24 and documentation 14 to carry out the authentication evaluation of methodology 80.

In step 88 imaging device 68 is used to capture an image of the machine-readable code 44 on the documentation 14. The image information may be transmitted to computing device 72 for decoding or directly or indirectly (such as via computing device 72) to authentication authority 32 for decoding. Alternatively, device 68 may decode the image and send the decoded information directly or indirectly to computing device 72 and/or authentication authority 32. As an optional aspect of step 88, additional image information of documentation 14 may be transmitted to authentication authority 32 in order to provide more information about the actual documentation 14 being evaluated for authentication. This may include images of the documentation 14 optionally under particular illumination (e.g., under LED illumination at one or more particular wavelengths), and/or the like. Optical character recognition strategies may be used to convert text images into text. The code 44 and other image information, if any, is stored in a memory in the authentication authority 32 until sufficient information is harvested from products 12 and/or 24 and documentation 14 to carry out the authentication evaluation of methodology 80.

In step 90, detector 70 is used to detect a spectral response of spectral signatures 37 and taggant key 40, if present, on the product 12 and/or documentation 14. Detection desirably occurs under a pre-determined form of illumination such as under the illumination of one or more LED illumination sources (not shown) that emit illumination within a relatively narrow bandwidth of the electromagnetic spectrum. It is desirable that a fluorescent spectral signature incorporated into the taggant key(s) is encoded in wavelengths that are distinct from the wavelengths of the LED illumination so that the detected spectral response is distinct from the illumination that triggers the spectral response. Otherwise, the illumination could wash out the signal, making the spectral signature hard to resolve by the detector 70 relative to the illumination. For example, LED illumination in ultraviolet or violet wavelengths may be suitable to trigger the spectral response of a taggant key encoding a spectral signature in wavelengths of the electromagnetic spectrum in the blue light regime or longer (e.g., green, yellow, orange, red, or infrared wavelengths). To further distinguish the signature's spectral regime of interest from the illumination, the detector may be fitted with at least one filter that blocks wavelengths associated with the illumination while allowing wavelengths associated with the spectral signature to pass. However, using such distinct wavelengths is not needed if the spectral signature is based on absorbing or reflecting taggants as such taggants either absorb or reflect the illumination source and thus a wide range of wavelengths (e.g., suitable portion(s) of the visible spectrum and/or the near infrared spectrum and/or the UV spectrum) is desirable in order to more effectively harvest aspects of the spectral signature.

In the practice of the present invention, ultraviolet light is light that has one or more wavelength peaks in the range from 100 nm to 400 nm. Violet light is light having one or more wavelength peaks in the range from greater than 400 nm to 450 nm. Blue light refers to light having one or more wavelength peaks in the range from 450 nm to 500 nm. Infrared light is light having one or more wavelength peaks in the range from 700 nm to 1200 nm.

In some modes of practice, signature features may be incorporated into two or more, separated bandwidth regions of the electromagnetic spectrum. In such instances, the same or different illumination sources may be used to provide illumination to trigger the desired responses. Such illumination and detection may occur in parallel or sequentially. Different detectors fitted with suitable filters to block the illuminations may be used.

The image information captured by imaging device 68 may be transmitted to computing device 72 for decoding or directly or indirectly (such as via computing device 72) to authentication authority 32 for decoding. Alternatively, device 68 may decode the image and send the decoded information directly or indirectly to computing device 72 and/or authentication authority 32. As an optional aspect of step 88, additional image information of documentation 14 may be transmitted to authentication authority 32 in order to provide more information about the actual documentation 14 being evaluated for authentication. This may include capturing images of the whole document, text, photos, graphs, tables, or other information. Optical character recognition strategies may be used to convert text images into text. The machine readable code 44 and other image information, if any, is stored in a memory in the authentication authority 32 until sufficient information is harvested from products 12 and/or 24 and documentation 14 to carry out the authentication evaluation of methodology 80.

In step 92, functionality in a local computing device 72 and/or in the authentication authority 32 carries out an evaluation to determine if a proper spectral signature associated with one of more of the identification codes 34, 38, 42, and/or 44 is detected. For example, if the database 52 in the authentication authority 32 indicates that taggant key 40a should be detected to match one or more of the identification codes 34, 38, 42, and/or 44, then functionality in the authentication authority carries out an evaluation to determine if the spectral signature associated with taggant key 40a is detected. If there are appropriate matches among taggant key 40a, the product 12, the documentation 14, and corresponding information securely held in the authentication authority 32, the documentation 14, the product 12, or both can be authenticated. If mismatches are uncovered, tampering or counterfeiting is uncovered and indicated with respect to product 12, product 24 and/or documentation 14.

In practical effect, and using public key encryption as an analogy, the spectral characteristics of each of the spectral signature 37 and taggant key 40 are a public key to the authentic, corresponding spectral signature stored in secure database 52 in the authentication authority 32, while the securely stored evaluation model stored in the local computing device 72 and/or authentication authority 32 serves as a private key to interpret the spectral signature 37 and taggant key 40 and thereby authenticate the product 12, the product 24, and/or the documentation 14.

Even if the proper spectral signature for the authentic taggant key 40 is detected, the present invention allows at least one further stage of authentication to occur if desired. For example, the authentication authority 32 may then either allows access and/or itself accesses additional secure information in its database system associated with the codes 34, 38, 42, and/or 44 to access one or more other aspects of the database information that are securely stored in the authentication authority 32 and that are associated with such codes. For example, functionality in authentication authority 32 can compare captured images or text with authentic, corresponding images or text stored in the database 52. If the additional images match the authentic, corresponding images or text stored in database 52, this further evidences that the products 12 and 24 and the documentation 14 are authentic. A mismatch indicates an issue such as counterfeiting or tampering.

According to one aspect, in step 93, additional information data optionally may be harvested in the course of practicing methodology 80 such as that corresponding to the serial number of the detector used, illumination type, location, date and time, sales details, and/or user data. The transferred data would then be stored in appropriate fields of the record(s) associated for the product package under evaluation.

In carrying out methodology 80 in some embodiments, computing device 72 may be configured to transmit the harvested data from steps 82 to 90 to the authentication authority 32 before, during or after other steps of methodology 80 have started or completed. The computing device 72 also may be configured to store the harvested data in a local memory initially and then transmit the data from the local memory to a remote memory in authentication authority 32 at a later time. For example, if the computer 72 does not have network connectivity (e.g., the Ethernet cable has been unplugged or the wireless connection has been interrupted) at the time of data harvesting, the computer 72 may instruct the local memory to store the data until the apparatus has reestablished network connectivity.

A taggant key 40 (FIGS. 2 and 4) of the present invention may incorporate one or more taggant compounds that emit a spectral response under suitable illumination. Examples of spectral responses that may encode all or a portion of a spectral signature include one or more of absorbance, reflectance, or photoluminescence (also referred to as luminescence herein).

For example, at least a portion of a spectral signature code is encoded in one or more portions of a luminescent spectrum of at least one luminescent compound. Luminescence refers to the spontaneous emission of light from a substance not resulting from heat. It can be viewed as a form of cold-body radiation and is distinguished from incandescence, which is light emitted by a substance as a result of heating. Because the luminescent spectrum is like a unique fingerprint emitted by a compound, a luminescent compound also may be referred to as a taggant compound to connote that the compound may be used to tag a substrate with the corresponding spectral signature. More preferably, at least a portion of a spectral signature code is encoded in one or more portions of one or more luminescent spectra of at least two or more luminescent taggant compounds. As an example, taggant key 40 in FIGS. 2 and 4 incorporates a combination of luminescent taggant compounds 41, 43 and 45.

The spectral response of a particular luminescent taggant compound refers to the luminescent spectrum, e.g., intensity, as a function of wavelength (or frequency) of that compound over at least one suitable wavelength (or frequency) range. The response also may be referred to in the spectroscopy field as the emission spectrum or the optical spectrum. The spectral response may be presented in a form of a diagram in which a characteristic of the response, such as power or intensity, is plotted as a function of the wavelength (or frequency), Often, this process occurs by illuminating taggant key 40 (FIG. 2*a*) with suitable light illumination (e.g., suitable wavelength and intensity characteristics to cause a luminescent response). Detector 70 (FIG. 4) is positioned to capture the luminescent emissions in order to harvest the spectral information.

Spectral signature codes may be encoded in one or more portions of a luminescent spectrum (or spectra if spectra are used) in wavelengths such as those in the range from 400 nm to 1200 nm, sometimes even from 550 nm to 1200 nm. Encoding may occur in higher or lower wavelengths, if desired. Multiple taggant compounds may produce a single, composite spectrum. Multiple taggant compounds may produce separate spectra if deployed in a manner such that the spectral responses are discrete. A single taggant compound or a mixture may produce multiple spectra if illuminated under different conditions such that each illumination condition triggers a different spectral response.

There are many types of luminescence useful in the practice of the present invention. Of the many types, photoluminescence (including fluorescence and phosphorescence) is more preferred as photoluminescent compounds emit luminescence in response to incident light illumination. Using illumination from light sources such as LED light sources is easy and economical. Luminescent compounds suitable in the practice of the present invention generally absorb incident light of suitable wavelength characteristics, experience photoexcitation, and then re-emit light as the excitation dissipates. Hence, luminescent light emission is different from incident light that is merely reflected or transmitted. Often, a luminescent compound absorbs light of certain wavelength(s) and re-emits light of a longer wavelength. Some luminescent compounds may absorb light of certain wavelength(s) and re-emit light of a shorter wavelength, however. For example, in an illustrative aspect, ultraviolet or violet LED illumination can trigger fluorescent responses in one or more of the longer blue, green, yellow, orange, red, and/or infrared wavelengths.

Figure 6:
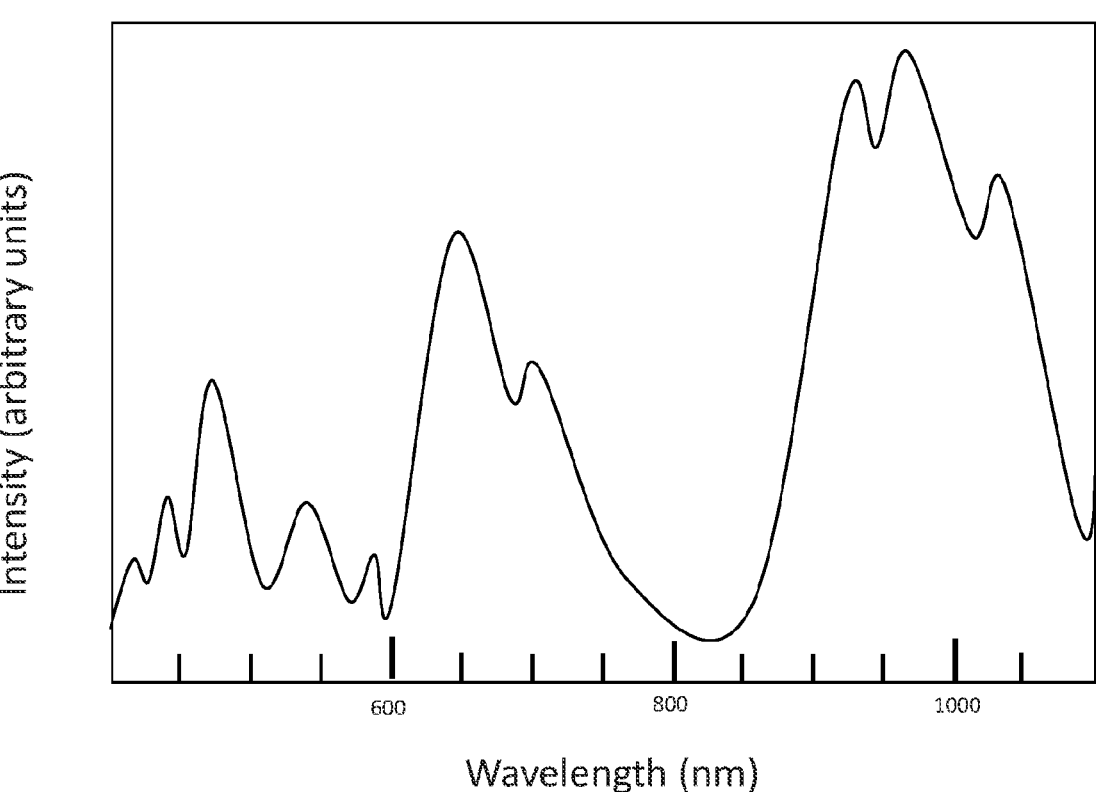
FIG. 6 schematically shows a luminescent spectrum emitted by a luminescent taggant compound, wherein intensity is plotted as a function of wavelength.

For purposes of illustration, FIG. 6 shows a spectral response associated with an exemplary luminescent taggant compound. The intensity of the spectral emissions of the luminescent compound is plotted as a function of wavelength. At each wavelength, the height of the curve indicates the intensity of detected light at that wavelength. Just as a fingerprint or signature of a person can be used to confirm the identity of that person, different luminescent taggant compounds exhibit spectral curves that are unique relative to the spectral responses of other luminescent taggant compounds. A spectral signature desirably may result from a composite of features of multiple spectra whose characteristics are impacted by factors including the kinds of taggant compounds, the ratios of the taggant compounds, how the compounds are incorporated into inks, how the inks are printed. The unique character of a resultant spectral signature means that a spectral signature can serve as a fingerprint to help identify or authenticate a particular substrate.

A typical spectral signature resulting from composite characteristics of multiple spectra from two or more taggant compounds dependent on many factors. A composite signature, therefore, is more complex and more unique to make it easier to distinguish, harder to reverse engineer, able to encode more information, and/or the like. Consequently, one or more spectral responses of one or more corresponding taggants can be integrated to provide a composite spectral signature that can be used to help identify or authenticate items in the practice of the present invention.

Luminescent compounds include phosphors (up and/or down converting), fluorescent compounds (sometimes referred to as fluorophores or fluorochromes), and/or phosphorescent compounds. Fluorescent compounds are preferred. Without wishing to be bound, it is believed that fluorescence results from an allowed radiative transition from a first excited singlet state to a relaxed/ground state. Without wishing to be bound, it is believed that phosphorescence results from a spin-forbidden transition from an excited triplet state to a relaxed singlet state.

Luminescent compounds useful in the practice of the present invention may be inorganic or organic. Fluorescent compounds in the form of organic dyes are particularly preferred, as these tend to be more compatible with inkjet printing, gravure printing, screen printing, flexographic printing, curtain coating, spin coating, and the like. Hence, each of compounds 41, 43, and/or 45 (FIGS. 2 and 4) may independently include at least one fluorescent compound and/or at least one phosphorescent compound, but preferably compounds 41, 43, and 45 each comprises a fluorescent compound, and more preferably each comprises an organic fluorescent dye.

Any two or more of compounds 41, 43, and/or 45 may interact according to fluorescence resonance energy transfer (FRET). FRET refers to a mechanism involving energy transfer between luminescent molecules. In practical effect, FRET occurs in a sequence where an illumination initially triggers an electronic, excited state by a first, or donor molecule. The excited state of the donor molecule is effective to transfer energy through dipole coupling to a suitable acceptor chromophore and trigger a further fluorescent emission by a second, or acceptor fluorescent compound.

In the practice of the present invention, optionally at least one of the taggant compounds 41, 43, and/or 45 (FIGS. 2 and 4) is a fluorescent taggant compound that emits a fluorescent spectrum in which spectral signature features are desirably derived at least from the blue light regime of the spectrum. Compounds that luminescently emit blue light in response to ultraviolet or violet illumination are known in the industry as optical brighteners. An optical brightener according to conventional practice helps to make an item appear whiter and brighter, but such compounds also are useful to provide at least a portion of a spectral signature.

In order to help make sure that the spectrum of such an optical brightener compound can be reasonably resolved from the illumination that triggers the luminescent response, a strategy of the present invention is to illuminate a taggant key 40 at least with ultraviolet light or violet LED illumination so that the blue light can be easily detected without undue interference from the ultraviolet or violet illumination. Further, the detector used to detect the blue light response may be fitted with an optical filter blocking ultraviolet and violet wavelengths, allowing blue and other wavelengths to reach the detector. The same LED illumination source, optical filter, and detector can be used to detect spectra of the other taggant compounds of taggant key 40 at the same time, if desired. Alternatively, if spectral signature features for the other taggant compounds are derived from longer wavelengths than the blue light regime, then a different LED illumination source, a different detector and optionally a different optical filter associated with such different detector may be used to detect the spectral response(s) of those other taggant compounds.

Examples of optical brightener compounds suitable in the practice of the present invention are luminescent compounds that emit a luminescent response including blue light having at least one illumination peak in the range from 420 nm to 500 nm in response to ultraviolet or violet LED illumination having an illumination peak in the wavelength range from 200 nm to 420 nm.

As an option, at least one taggant compound may be an infrared (IR) absorbing compound. Infrared (IR) absorbing compounds may not be luminescent in some instances, but rather the absorption of IR light by the infrared absorbing compound will manifest as a reduction in the intensity of corresponding reflected IR illumination in one or more IR bandwidth portion(s) of the electromagnetic spectrum. This attenuation or reduction in reflectance intensity may be detected and correlated to the presence of such a compound. In the absence of such compound(s), the attenuation of reflectance intensity would not be present. Desirably, an infrared absorbing compound if present is used in combination with at least one luminescent compound.

Figure 7:
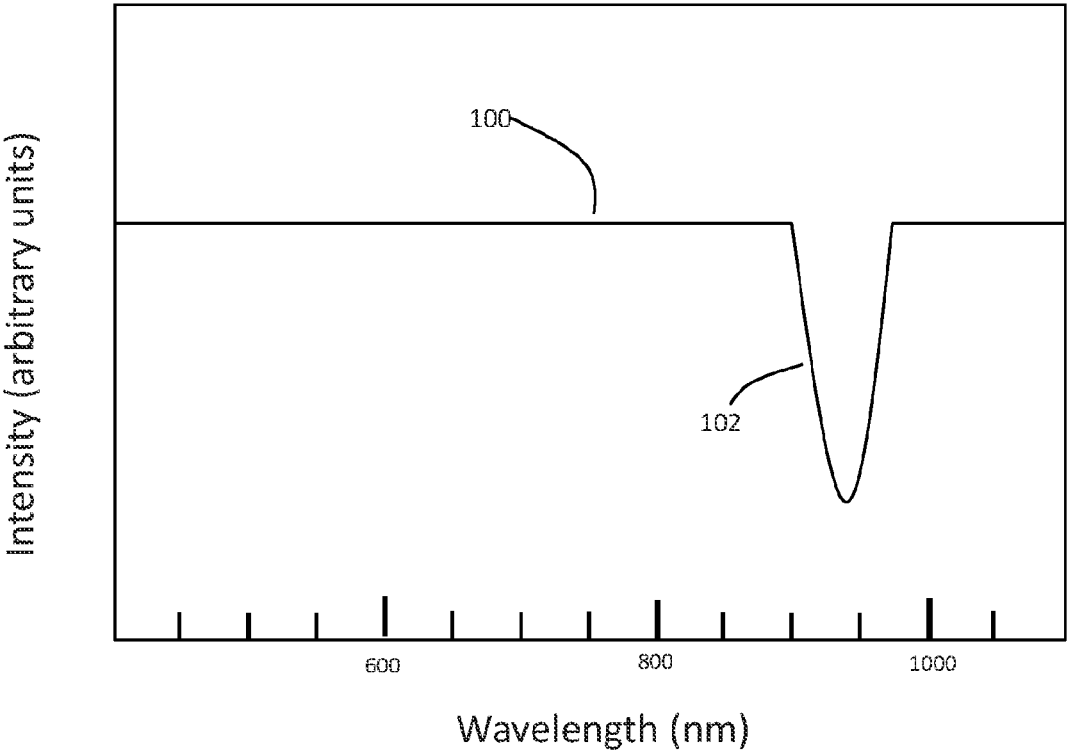
FIG. 7a schematically illustrates how the presence of an infrared absorber compound reduces the intensity of light reflected from a marked substrate in an infrared bandwidth of the spectrum.

The impact of an IR absorbing compound upon reflectance intensity is shown FIG. 7*a*. FIG. 7*a* shows a curve 100 of the intensity of reflected light as a function of wavelength. Curve 100 includes depression 102 in an infrared bandwidth portion. Depression 102 is a result of one or more infrared absorbing compounds absorbing incident illumination in this bandwidth portion to reduce the intensity of the reflected light in the region. In the absence of such a compound, there would be no such attenuation of curve 100. This effect can be incorporated into a portion of a spectral signature that is based on the presence of the depression 102 or its absence. For example, a spectral signature may only be authentic if one of the signature criteria is that this depression 102 is present in detected spectral data. Or, an alternative code may require that the depression be absent if, for example, one or more other specific signature features are present.

Examples of fluorescent compounds are described in U.S. Pat. Nos. 8,034,436; 5,710,197; 4,005,111; 7,497,972; 5,674,622; and 3,904,642.

Examples of phosphorescent compounds for use as compounds are described in U.S. Pat. Nos. 7,547,894; 6,375,864; 6,676,852; 4,089,995; and U.S. Pat. Pub. No. 2013/0153118.

Examples of optical brightener compounds are described in U.S. Pat. Nos. 6,165,384; 8,828,271; 5,135,569; 9,162,513; and 6,632,783.

Examples of infrared absorbing compounds are described in U.S. Pat. Nos. 6,492,093; 7,122,076; 5,380,695; and Korea patent documents KR101411063; and KR101038035.

Examples of up and down converting phosphors are described in U.S. Pat. Nos. 8,822,954; 6,861,012; 6,483,576; 6,813,011; 7,531,108; and 6,153,123.

The taggant key 40 including taggant compounds 41, 43, and 45 (FIGS. 2 and 4) may be incorporated onto documentation 14 in a variety of different ways in one or more locations. Two or all three of the taggant compounds 41, 43, and 45 may be deployed as a mixture. Alternatively, one or all three may be deployed separately from the other(s). Even if printed in one location, two or more of the taggant compounds 41, 43, and/or 45 may be printed in separate layer(s) from the other(s). Strategies for printing taggant inks containing taggant compounds are described in Assignee's co-pending applications United States Provisional patent application having Ser. No. 62/866,722, filed on Jun. 26, 2019, entitled STANDARDIZATION OF TAGGANT SIGNATURES USING TRANSFER IMAGES; U.S. Provisional Patent Application No. 62/845,018, filed May 8, 2019, titled SPECTRAL SIGNATURE SYSTEMS THAT USE ENCODED IMAGE DATA AND ENCODED SPECTRAL SIGNATURE DATA; and U.S. Provisional Patent Application No. 62/893,505 filed on Aug. 29, 2019, entitled "STANDARDIZATION OF TAGGANT SIGNATURES USING TRANSFER IMAGES ("Assignee's Co-Pending Applications). In illustrative embodiments such as shown in FIGS. 2 and 4, the taggant key 40 is printed onto documentation as a shape 47 including all three of taggant compounds 41, 43, and 45 in admixture. The spectral signature is read by provoking spectral responses from the taggant compound(s) 41, 43, and 45. The spectral responses then are detected with suitable detector(s).

Functionality incorporated into or cooperative with the authentication authority 32 (FIGS. 3, 4, and 5) may then use the detected spectral information to confirm if desired spectral features indicative of a particular spectral signature are present. In one embodiment, such functionality is incorporated into computer 72 (FIG. 4). Computer 72 desirably includes programming instructions that evaluate information comprising the spectral data emitted by the taggant key 40 (FIG. 2*a*) in response to illumination by an LED illumination system to determine information indicative of whether the taggant key 40 incorporated into documentation 14 provides the proper spectral signature for the codes 34, 38, 42, and/or 44 appearing in the product package 18 (FIGS. 1 and 2). To carry out this evaluation, computer 72 may further include programming instructions that decode image information obtained by capturing images of the machine readable codes 38 and 44. As a further option, computer 72 may further include programming instructions that use optical character recognition strategies to identify identification codes from the image information, if any, of the identification codes 34 and 42.

Because some spectral signatures may be very difficult to reverse engineer, spectral signatures are useful to authenticate codes 42 and/or 44, and thereby help to authenticate documentation 14 and product 12. For example, a spectral signature will only match proper codes associated with the spectral signature. If an unknown signature is detected, or if the wrong signature is detected, there would be a mismatch with respect to one or more of the codes 34, 38, 42, and/or 44. A mismatch indicates that codes and/or the signature(s) have been counterfeited, changed or otherwise altered. The result is that the authenticity of the products 12 or 24 and/or the documentation 14 is called into question. Spectral signatures are useful for authentication, because other features on documentation, such as identification codes, a barcode, a graphic image, or text information, are easier to copy without proper authorization.

Figure 8:
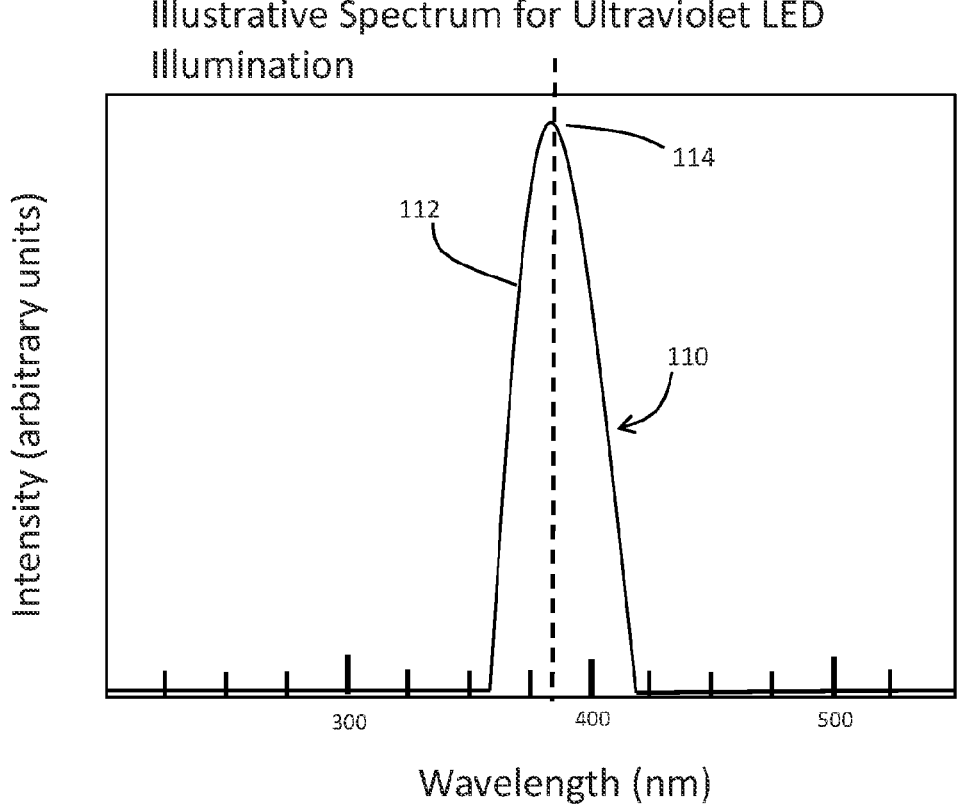
FIG. 8 schematically illustrates a typical spectrum of ultraviolet LED illumination, wherein intensity is plotted as a function of wavelength of the LED illumination.

FIG. 8 schematically shows an exemplary optical spectrum 110 for a typical LED illumination source. For purposes of illustration, the spectrum of an ultraviolet LED illumination source is depicted. Spectrum 110 is plotted in the form of normalized intensity as a function of wavelength (nm). Spectrum 110 includes a single, main intensity peak 112 spanning a relatively narrow wavelength bandwidth (e.g., a peak that spans a wavelength bandwidth of about 70 to 150 nm) while other portions of the spectrum outside the single main peak 112 exhibit a substantially flat baseline of substantially 0 units of normalized intensity. The practical effect is that each LED source emits illumination within a relatively tight wavelength band, but emits substantially no illumination outside the band, Peak 112 has a peak maximum 114. Other spectra for other kinds of LED illumination sources would generally have a similar overall shape with each other but those would have single main spectral peaks that are shifted on the wavelength axis relative to each other.

The narrow bandwidth associated with LED illumination is well-suited for use in triggering luminescent emissions of taggant compounds that can be detected by a suitable detector. Often, the luminescent response of a particular compound will include spectral components both that overlap the narrow main spectral peak of the LED illumination as well as additional spectral components that are outside the LED main spectral peak. The additional portions of the spectrum outside the main spectral peak of the LED illumination are easily detected without undue interference from the narrow LED spectrum. Optionally, a spectral signature detector may be fitted with an optical filter in order to block wavelengths associated with the LED illumination. For example, a spectral detector may be fitted with an optical filter that blocks wavelengths under 400 nm when an LED illumination source with a main spectral peak including 385 nm is used. As another example, a spectral detector may be fitted with an optical filter that blocks wavelengths under 550 nm when an LED illumination source with a main spectral peak including 458 nm is used. In contrast to using LED illumination, if broader illumination were used to trigger a luminescent response, the illumination could illuminate the detector with too much light intensity to allow accurately reading the signature spectra of interest.

Figure 9:
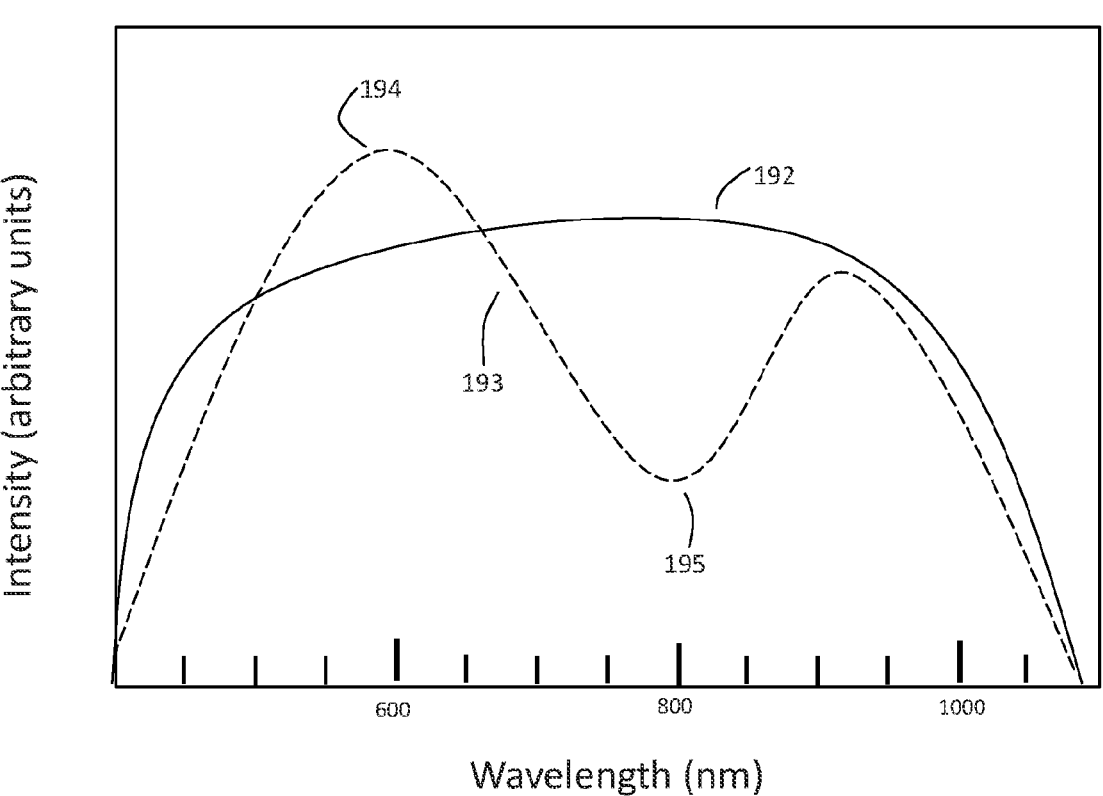
FIG. 9 schematically illustrates an example of a broad band reflectance spectrum when a broad band light source is used in both the presence and absence of a taggant compound.

As yet another example, a spectral detector may be fitted with a broad band light source or light sources ranging from 300 to 700 nm, 600 to 1200 nm, or ranges even more expansive such as 200 to 1600 nm. In contrast, in other situations, including even if no optical filters are used, the detector is capable of collecting a reflectance spectrum of the surface being illuminated. FIG. 9 shows an illustrative example of a broad band reflectance spectrum when a broad band light source is used in both the presence and absence of a taggant compound. When no taggant is present the light source is reflected from a surface and captured by detector resulting in spectrum 192. Alternatively, when a taggant compound such as 41, 43 and/or 45 is incorporated into or onto the substrate the wavelength intensities of the reflected light are changed. This change results in changes to the reflected spectrum 193 where changes 194 (peak) and 195 (valley) are illustrative of taggant compounds 41, 43 and/or 45 interacting with illumination and reflecting back a new spectral signature.

Using LED illumination in the ultraviolet or violet range is desirable when using an optical brightener compound as a taggant compound or otherwise when encoding signature features in at least the blue light regime and/or longer wavelengths. As between using LED illumination in the ultraviolet range or the violet range to trigger such a fluorescent response, ultraviolet LED illumination is preferred. The reason is that ultraviolet light has less potential to overlap and wash out the blue light fluorescently emitted by taggant compound(s) as compared to using violet LED illumination. As a practical matter, this means that using ultraviolet LED illumination makes the emitted signature easier to detect and resolve without interference from the illuminating light. Ultraviolet (UV) light includes UV-C light having a wavelength in the range from 100 nm to 280 nm, UV-B light having a wavelength in the range from 280 nm to 315 nm, and UV-A light having a wavelength in the range from 315 nm to 400 nm. Ultraviolet LED illumination having an illumination peak in the UV-A band is presently preferred. One example of such LED illumination is an LED light source that provides an illumination peak at 385 nm.

Figure 10:
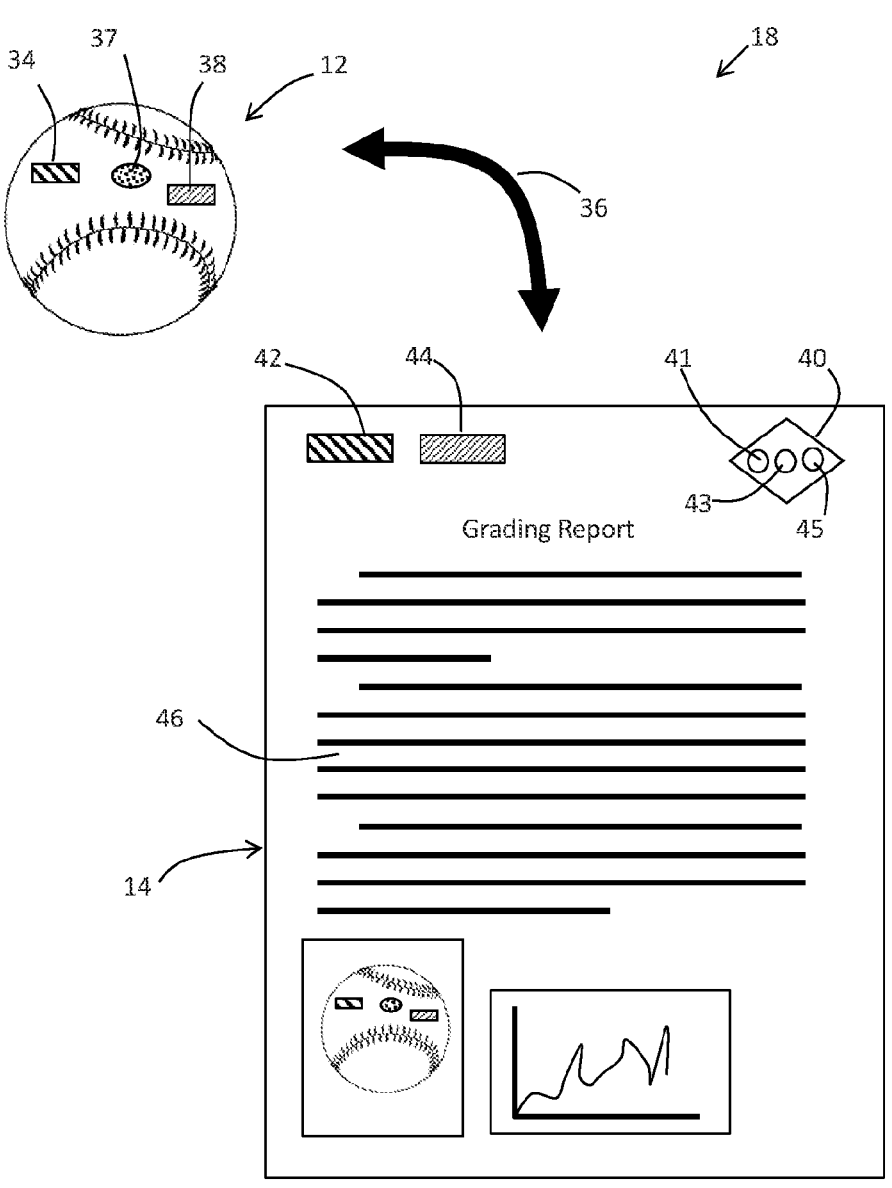
FIG. 10 schematically illustrates the features of a product package similar to that of FIG. 2 except that the product package includes a sports memorabilia object instead of a gemstone.

FIG. 10 is identical to FIG. 2 except that a sports memorabilia object in the form of a baseball is the product 12 of the product package 18 instead of the gemstone 12 of FIG. 2. Also, the documentation 14 is in the form of a grading report linked with the baseball.

Figure 11:
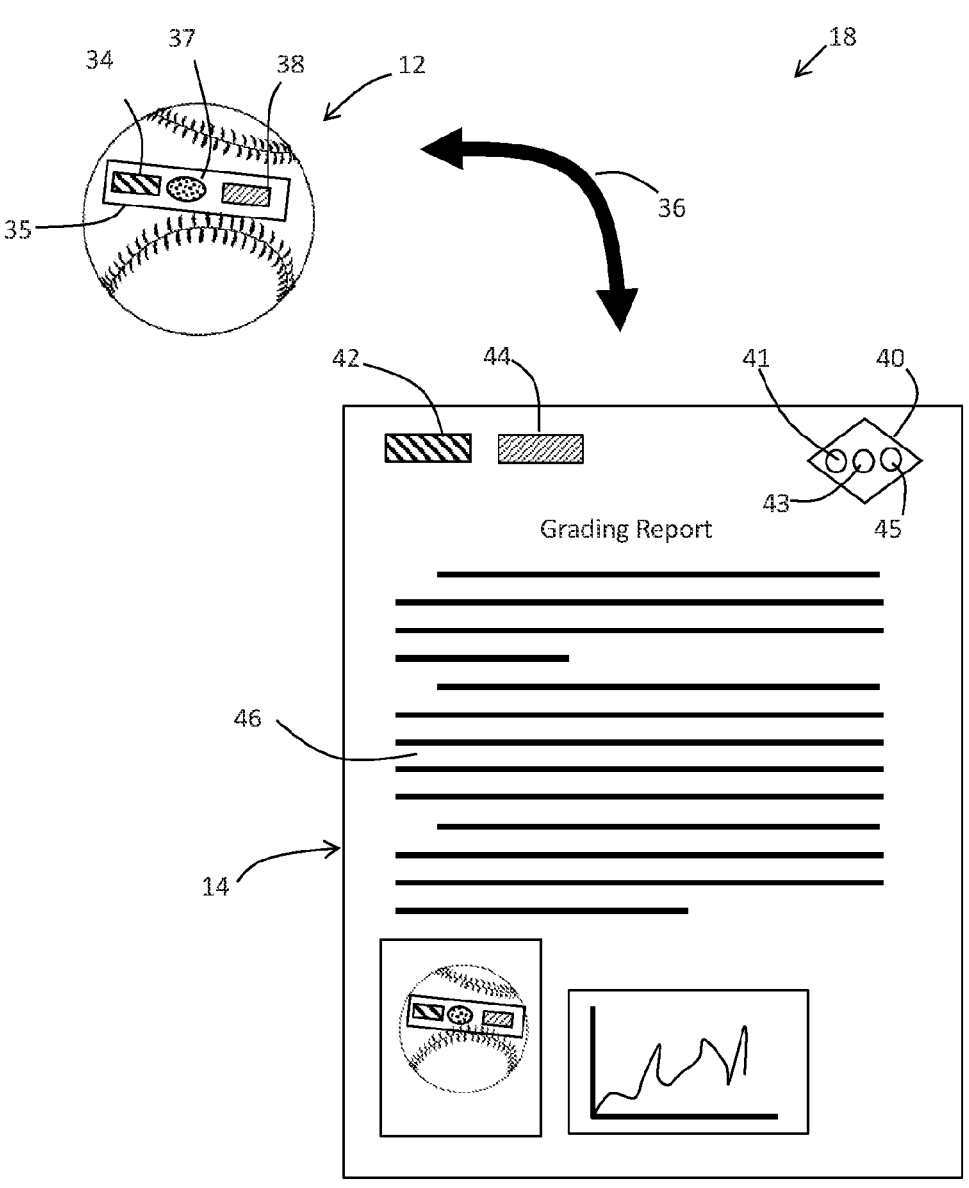
FIG. 11 schematically illustrates the features of a product package similar to that of FIG. 10 except that identification code information and a spectral signature for the sports memorabilia object are affixed to the object on a sticker.
Figure 12:
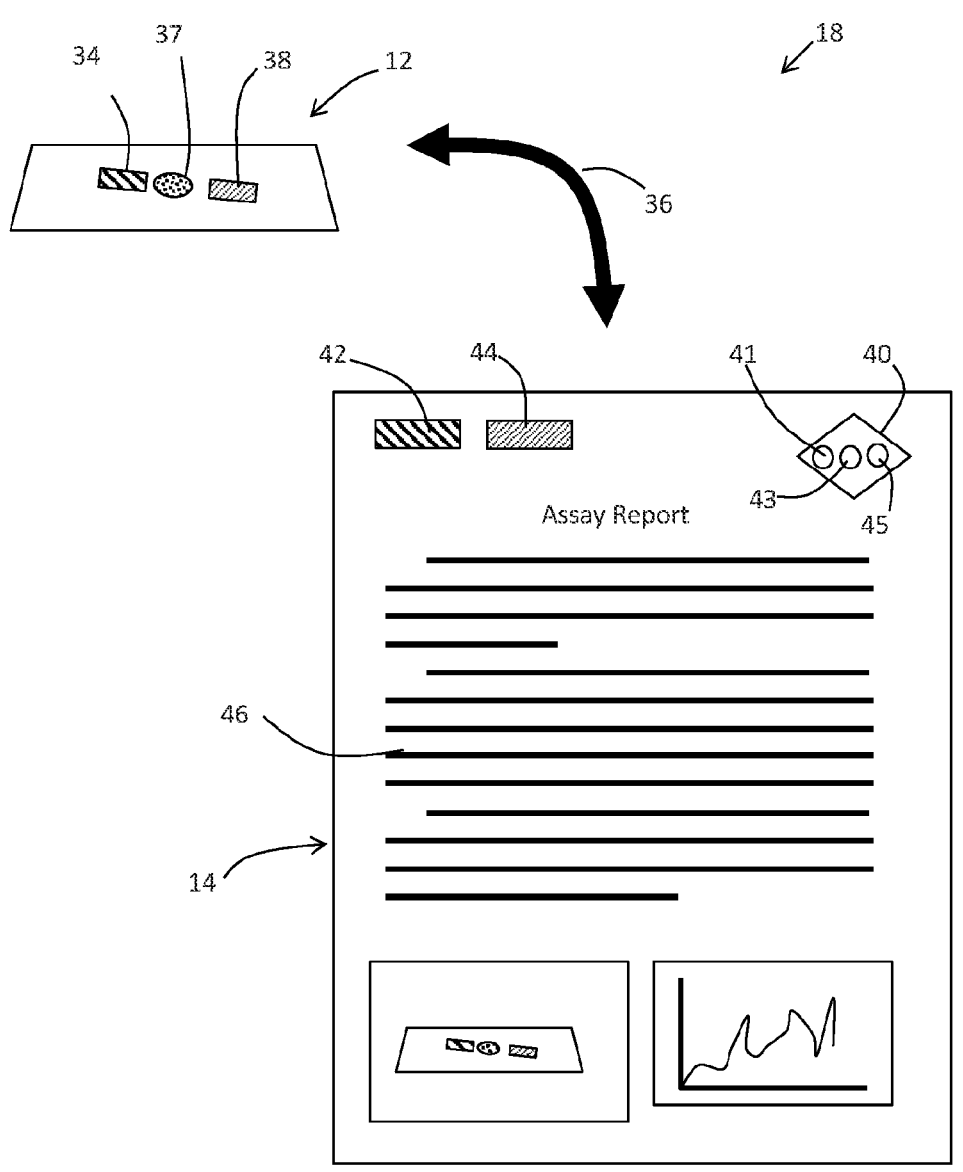
FIG. 12 schematically illustrates the features of a product package similar to that of FIG. 2 except that the product package includes a gold bar instead of a gemstone, FIG. 13 schematically illustrates the features of a product package similar to that of FIG. 2 except that the product package includes a wine bottle instead of a gemstone and that identification code information and a spectral signature for the wine bottle object are affixed to the object on a sticker.

FIG. 11 is identical to FIG. 10 except that the codes 34 and 38 and the signature 37 on the product 12 are affixed to the product 12 on a sticker 35, FIG. 12 is identical to FIG. 2 except that an object in the form of a gold bar is the product 12 of the product package 18 instead of the gemstone 12 of FIG. 2. Also, the documentation 14 is in the form of an assay report linked to the gold bar.

Figure 13:
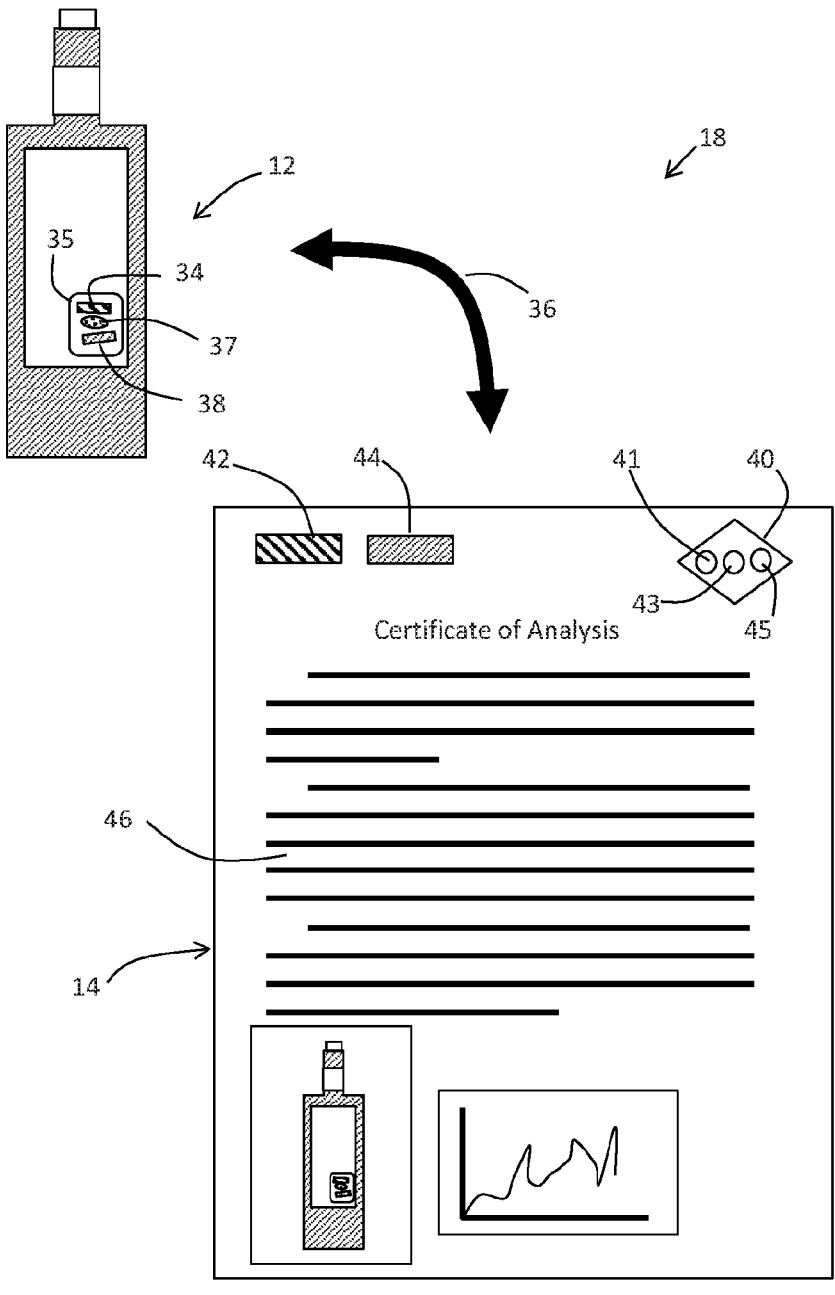

FIG. 13 is identical to FIG. 2 except that an object in the form of a wine bottle is the product 12 of the product package 18 instead of the gemstone 12 of FIG. 2. Also, the documentation 14 is in the form of a grading certification linked to the wine bottle.

All patents, patent applications, and publications cited herein are incorporated herein by reference in their respective entities for all purposes. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method of providing authentication information for an authentic substrate and authentic documentation associated with the authentic substrate, comprising the steps of:

a. providing at least one identification code associated with the authentic substrate;

b. providing at least one identification code associated with the associated, authentic documentation;

c. providing a taggant key on the associated, authentic documentation, said taggant key providing spectral characteristics responsive to illumination by at least one light source, wherein a spectral signature is encoded in the spectral characteristics of the taggant key;

d. storing a record in a database, wherein the record stores authentication attributes of the authentic substrate and the associated, authentic documentation in fields comprising the identification code associated with the authentic substrate, the identification code associated with the associated, authentic documentation, and the taggant key provided on the associated, authentic documentation; and e. providing functionality that allows information harvested from an evaluated substrate and an evaluated document to be compared to the authentication attributes stored in the fields of the record in order to determine that the evaluated substrate is a match for both the authentication attributes of the authentic substrate and the associated, authentic documentation, and that the evaluated document is a match for both the authentication attributes of the authentic documentation and the associated, authentic substrate.

2. The method of claim 1, wherein the authentic substrate is a gemstone.

3. The method of claim 2, wherein the gemstone is a diamond.

4. The method of claim 2, wherein the gemstone is incorporated into a value added product.

5. The method of claim 1, wherein the least one identification code associated with the authentic substrate comprises an alphanumeric string.

6. The method of claim 1, wherein the least one identification code associated with the authentic substrate comprises a bar code.

7. The method of claim 6, wherein the bar code is encrypted.

8. The method of claim 1, wherein the least one identification code associated with the authentic substrate comprises a first identification code comprising an alphanumeric string and a second identification code comprising a bar code.

9. The method of claim 1, further comprising linking the at least one identification code for the substrate with the at least one identification code for the authentic documentation in a manner effective to show that the authentic substrate and the authentic documentation are associated.

10. The method of claim 1, wherein the at least one authentic taggant key includes two or more taggant compounds.

11. The method of claim 1, wherein the authentic substrate and the associated, authentic documentation comprises a product package, and wherein step e) further comprises providing a database comprising a record for the product package comprising fields for the at least one authentic identification code and the at least one authentic taggant key for the documentation such that the database links the product package to the at least one authentic taggant key.

12. The method of claim 11, wherein the record comprises authentic information fields that include authentic information and harvested information fields that include harvested information harvested from an evaluated product or evaluated documentation.

13. The method of claim 12, wherein the harvested information includes harvested image information and wherein the method further comprises determining an identification code from the harvested image information.

14. The method of claim 13, wherein the harvested information includes a detected taggant key and a detected identification code, and wherein the method further comprises using the database to determine if the detected taggant key is properly associated with the detected identification code.

15. The method of claim 12, wherein step e) further comprises functionality that compares the harvested information to the authentic information to evaluate authenticity.

16. The method of claim 15, wherein matching harvested information with authentic information indicates authenticity.

17. The method of claim 15 wherein a mismatch between harvested information and authentic information indicates an authenticity issue.

18. The method of claim 15, wherein the authentic information fields further comprises a stored image of the authentic substrate and/or the associated, authentic documentation.

19. The method of claim 1, further comprising linking the at least one authentic taggant key to more than one product package, wherein each product package comprises an authentic substrate and associated, authentic documentation.

20. The method of claim 1, wherein step e) further comprises allowing a user to have access to functionality that depends on a user class.

21. A method to evaluate the authenticity of an evaluated object and an evaluated document, comprising the steps of:

a. associating at least an identification code directly or indirectly to an authentic object associating a taggant key and an identification code to associated, authentic documentation and, wherein:

i. the presence of the taggant key and the identification codes on the evaluated object and the evaluated document provides an indication that the evaluated object and/or the evaluated document are authentic;

ii. the taggant key produces spectral characteristics responsive to illumination by at least one light source, wherein a spectral signature is encoded in the spectral characteristics of the taggant key; and iii. the identification codes comprises readable indicia that help to identify the authentic object and the associated, authentic documentation; and b. causing authentication information for the authentic object and the associated, authentic documentation to be stored in a local and/or remote information repository, wherein:

i. said authentication information comprises a record in the local remote information repository, said record storing attributes of the authentic object and the associated, authentic document in a plurality of fields, said stored attributes including information indicative of the associated identification codes and the taggant key; and ii. said authentication information is guarded by a security protocol that comprises the steps of:

1. determining if the taggant key and/or the identification codes for the authentic object and the authentic document are present on the evaluated object and the evaluated document;

2. preventing access to the authentication information if any of the taggant key and the identification codes are not present on the evaluated object and the evaluated document; and 3. allowing access to the authentication information if all of the taggant key and the identification codes are present on the evaluated object and the evaluated document, the evaluated object match both its own stored authentication attributes and those of the associated, authentic documentation, and the evaluated document match both its own stored authentication attributes and those of the associated, authentic object, thereby providing bidirectional cross-validation between the object and the document.

22. An authentication system, comprising:

a. a plurality of, unique, authentic identification codes, each unique, authentic code of said plurality comprising unique, observable indicia that distinguishes each unique, authentic identification code from the other unique, authentic identification codes of said plurality;

b. a plurality of unique, authentic taggant keys, wherein:

i. each unique, authentic taggant key of the plurality is associated with one or more of the unique, authentic identification codes; and ii. each unique, authentic taggant key produces spectral characteristics responsive to illumination by at least one light source, wherein a unique spectral signature is encoded in the spectral characteristics of each unique, authentic taggant key that distinguishes each unique, authentic taggant key from the other unique, authentic taggant keys in said plurality;

c. a spectral analysis key that comprises an algorithm that processes detected spectral characteristics in a manner effective to determine if a unique, authentic spectral signature of a unique, authentic taggant key is encoded in the detected spectral characteristics;

d. an authentic object comprising at least one of the unique, authentic identification codes and an associated, authentic document comprising at least one of the unique, authentic taggant keys and at least one of the unique, authentic identification codes;

e. an information repository that securely stores authentication information for the authentic object and the associated, authentic document, said authentication information including authentication information indicative of the at least one unique, authentic taggant key and the unique identification codes for the authentic object and the associated, authentic document; and f. information repository security programming that comprises the steps of:

i. determining if the at least one unique, authentic taggant key and/or the at least one unique, authentic identification code for the authentic document is present on an evaluated document;

ii. preventing access to the authentication information if any of the at least one unique, authentic taggant key and the at least one unique, authentic identification code of the authentic document is not present on the evaluated document; and iii. allowing access to the authentication information only if (a) the at least one unique, authentic taggant key and the at least one unique, authentic identification code are present on the evaluated document, and (b) the evaluated object matches both its own stored authentication attributes and those of the associated, authentic document, and (c) the evaluated document matches both its own stored authentication attributes and those of the associated, authentic object, thereby providing bidirectional cross-validation between the object and the document.

* * * * *